(12) United States Patent
Seki et al.

(10) Patent No.: US 7,969,897 B2
(45) Date of Patent: Jun. 28, 2011

(54) RELAY DEVICE, COMPUTER READABLE MEDIUM STORING TEST PROGRAM AND A METHOD FOR TESTING RELAY DEVICE

(75) Inventors: Hiroshi Seki, Kawasaki (JP); Hiroyuki Kaneda, Yokohama (JP); Masayuki Kanno, Kawasaki (JP); Akira Nakamizu, Kawasaki (JP); Syuuhei Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 12/323,787

(22) Filed: Nov. 26, 2008

(65) Prior Publication Data

US 2009/0147691 A1    Jun. 11, 2009

(30) Foreign Application Priority Data

Nov. 28, 2007   (JP) ................................ 2007-306853

(51) Int. Cl.
*H04L 12/26* (2006.01)
*G06F 11/00* (2006.01)

(52) U.S. Cl. ........................................ 370/246; 370/392

(58) Field of Classification Search ........................ None
See application file for complete search history.

(56) References Cited

U.S. PATENT DOCUMENTS

| 5,764,624 | A  | * | 6/1998  | Endo et al. ................ 370/218 |
| 7,436,776 | B2 | * | 10/2008 | Koga ........................ 370/246 |
| 7,636,299 | B2 | * | 12/2009 | Asa et al. ................... 370/216 |
| 2004/0128554 | A1 | * | 7/2004 | Maher et al. .............. 713/201 |
| 2004/0153858 | A1 | * | 8/2004 | Hwang ........................ 714/43 |
| 2007/0097989 | A1 | * | 5/2007 | Sato ....................... 370/395.52 |
| 2007/0280247 | A1 | * | 12/2007 | Mera et al. ................ 370/392 |
| 2009/0296588 | A1 | * | 12/2009 | Nishi et al. ................ 370/242 |

FOREIGN PATENT DOCUMENTS

JP        07-095236       4/1995

* cited by examiner

*Primary Examiner* — Min Jung
(74) *Attorney, Agent, or Firm* — Staas & Halsey LLP

(57) ABSTRACT

A relay device for relaying transfer data to be transmitted between the devices has a plurality of testers. Each of the testers determines whether received transfer data is normal or not, and discards the transfer data that is determined abnormal. The relay device also has a counter that counts a number of transfer data discarded by each of the testers respectively, and a determiner that determines whether an operation of each tester is normal or not based on the number of discarded transfer data counted by the counter.

9 Claims, 22 Drawing Sheets

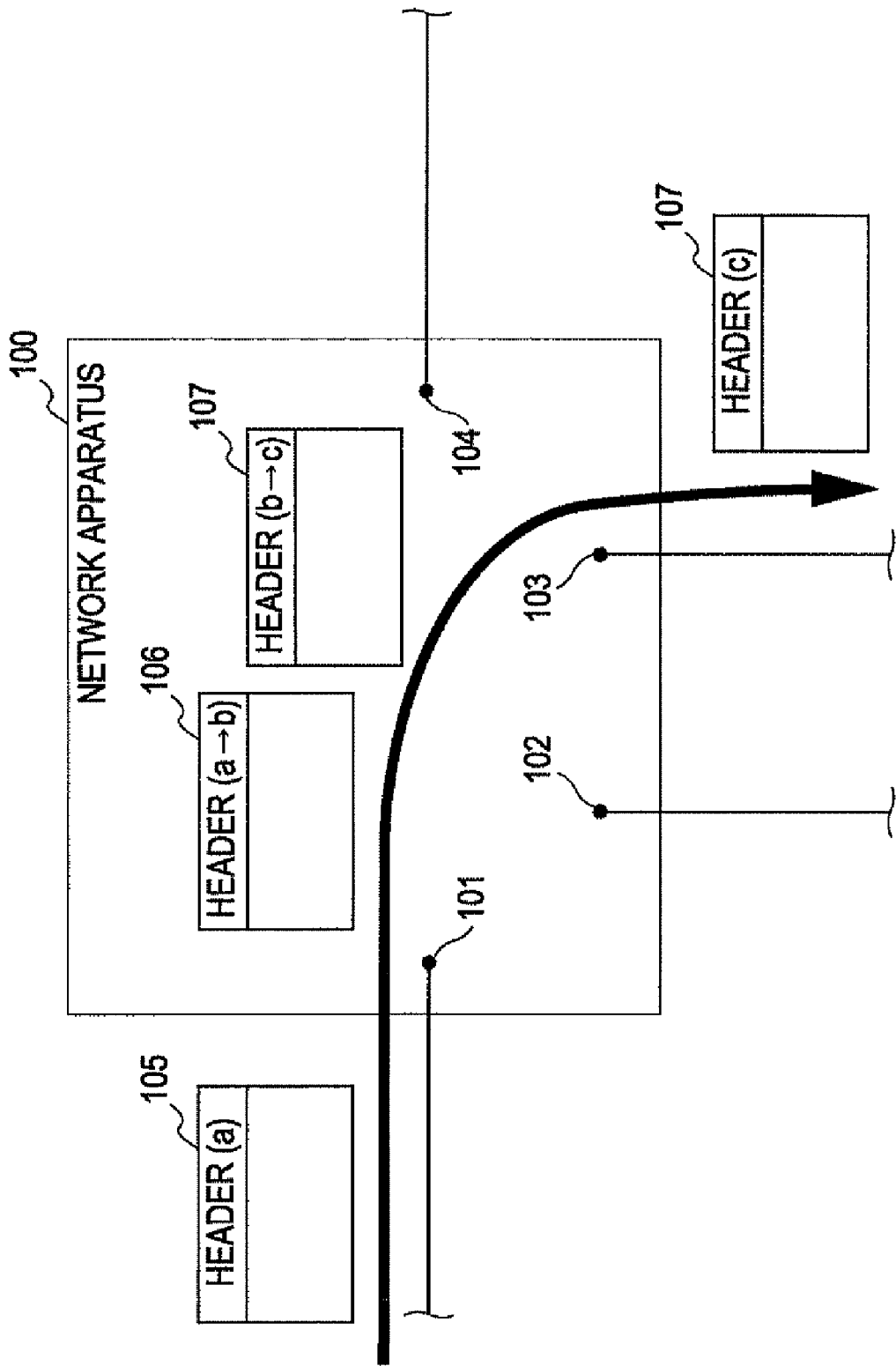

FIG. 19A

| CONTENTS OF HEADER (a) |
| --- |
| LAYER-2 TRANSMISSION SOURCE NETWORK ADDRESS (AAAAAAA) |
| LAYER-2 DESTINATION NETWORK ADDRESS (BBBBBBB) |
| LAYER-3 TRANSMISSION SOURCE NETWORK ADDRESS (CCCCCCC) |
| LAYER-3 DESTINATION NETWORK ADDRESS (DDDDDDD) |

FIG. 19B

| CONTENTS OF HEADER (b) |
| --- |
| INTRA-APPARATUS INPUT PORT No. (#1) |
| INTRA-APPARATUS DESTINATION PORT No. (#3) |
| LAYER-3 TRANSMISSION SOURCE NETWORK ADDRESS (CCCCCCC) |
| LAYER-3 DESTINATION NETWORK ADDRESS (DDDDDDD) |

FIG. 19C

| CONTENTS OF HEADER (c) |
| --- |
| LAYER-2 TRANSMISSION SOURCE NETWORK ADDRESS (XXXXXXX) |
| LAYER-2 DESTINATION NETWORK ADDRESS (YYYYYYY) |
| LAYER-3 TRANSMISSION SOURCE NETWORK ADDRESS (CCCCCCC) |
| LAYER-3 DESTINATION NETWORK ADDRESS (DDDDDDD) |

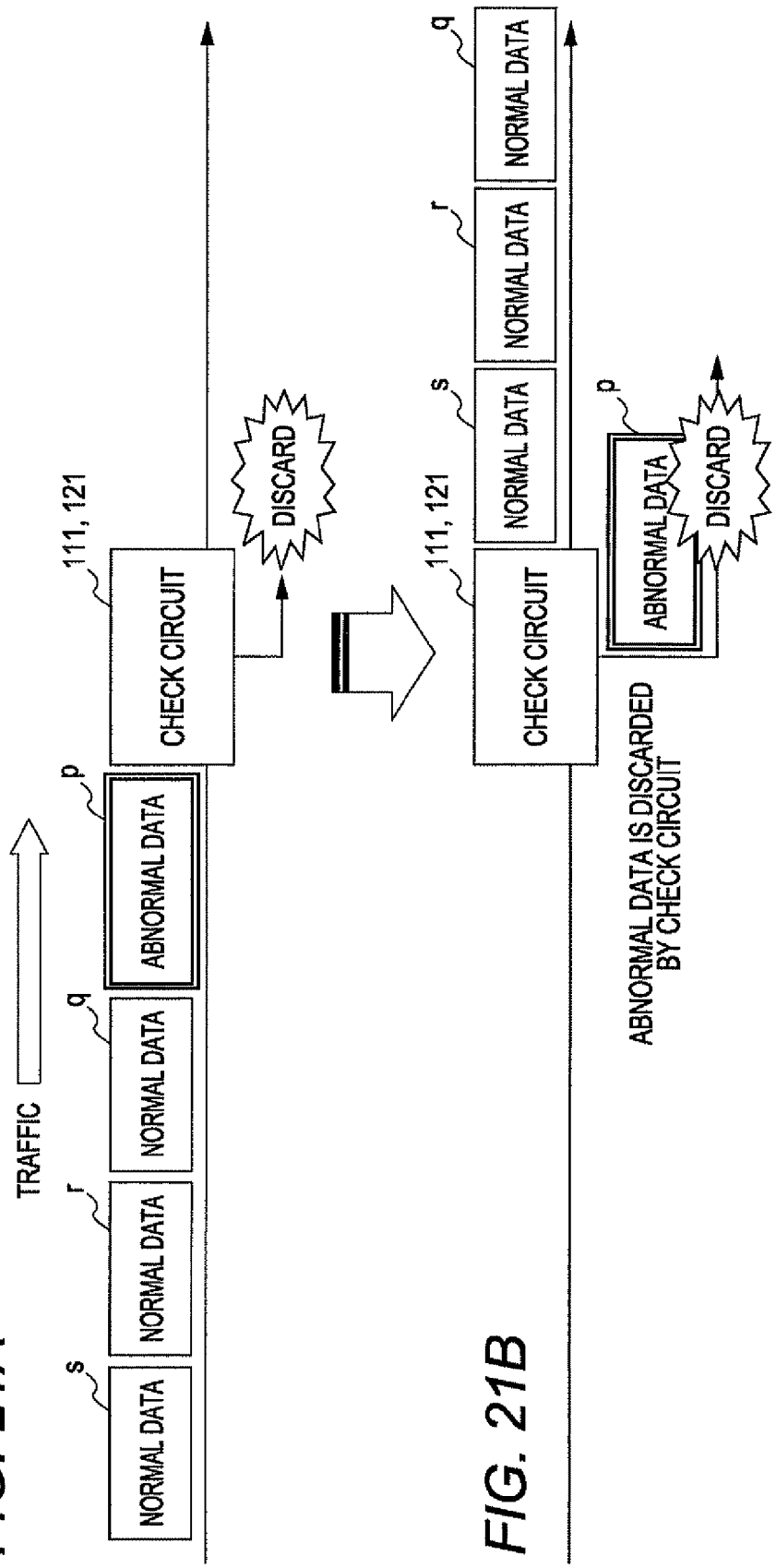

RELAY DEVICE, COMPUTER READABLE MEDIUM STORING TEST PROGRAM AND A METHOD FOR TESTING RELAY DEVICE

CROSS-REFERENCE TO RELATED APPLICATIONS

This application is based upon and claims the benefit of priority of the prior Japanese Patent Application No. 2007-306853, filed on Nov. 28, 2007, the entire contents of which are incorporated by reference herein.

BACKGROUND

1. Field

One aspect of the present invention relates to a relay device that relays transfer data which is transmitted and received between a plurality of apparatuses connected to each other.

2. Description of the Related Art

A network apparatus such as a switch or a router has a plurality of ports through which is connected to other network apparatuses. The network apparatus transfers data received through each of the ports to an appropriate port different from the port through which the data was received. The network apparatus transfers data in accordance with control information such as a header contained in relevant data. In such a manner, the data is transferred from one apparatus having relevant data to another apparatus. Hereinafter, control information is referred to simply as a "header".

The network apparatus rebuilds the header in the data and transfers the data based on a result of searching a routing table. An example of header rebuilding will be described below with reference to FIG. 18. A network apparatus 100 shown in FIG. 18 has four ports 101-104. In the network apparatus 100, transfer data 105 containing a header a input through a port 101 is converted into transfer data 106 in which the header a is changed to a header b based on a first routing table (not shown).

As shown in FIG. 19A, for example, the header a contains "layer-2 transmission source network address (AAAAAAAA)", "layer-2 destination network address (BBBBBBBB)", "layer-3 transmission source network address (CCCCCCCC)", and "layer-3 destination network address (DDDDDDDD)". That is, the header a is made up of an address of layer 2 as a data link layer and an address of layer 3 as a network layer.

Then, as shown in FIG. 19B, the network apparatus 100 converts the header a into the header b, by converting "layer-2 transmission source network address (AAAAAAAA)" contained in the header a into information which indicates a port number (#1) of the input port 101 in the network apparatus 100, and "layer-2 destination network address (BBBBBBBB)" contained in the header a into information which indicates a port number (#3) of the output port 103 in the network apparatus 100. That is, to transfer data in the network apparatus 100, the contents of layer 2 are cleared, and then given information peculiar to the network apparatus 100, such as a port number, which is ascribed to the structure of the network apparatus 100.

Thus, the header a is converted into the header b in order to transfer data from the port 101 to the port 103 in the network apparatus 100. The header a is converted into the header b by converting a typical header format in a network into a format peculiar to the network apparatus 100.

Then, after transferring the transfer data 106 with the network apparatus 100, the transfer data 106 is converted into transfer data 107 in which the header b is changed to a header c based on a second routing table in the network apparatus 100.

As shown in FIGS. 19B and 19C, the network apparatus 100 converts the header b into the header c. The network apparatus 100 converts "intra-apparatus input port number (#1)", that is, information indicating the input port 101, into "layer-2 transmission source network address (XXXXXXXX)" contained in the header b. The network apparatus 100 converts "intra-apparatus destination port number (#3)", that is, information indicating the output port 103, into "layer-2 destination network address (YYYYYYYY)" contained in the header b.

In such a manner, the network apparatus 100 clears the header b of the contents peculiar to the network apparatus 100, that is, a transmission source port number and a destination port number, and instead adds the contents of layer 2, that is, a transmission source address and a destination address, to transmit the transfer data 107 from the port 103 in a typically prescribed format.

The header b is converted into the header c in order to convert a data format peculiar to the apparatus into a typically prescribed header format so that transfer data may be transmitted to the network via the port 103.

An example of the configuration of the network apparatus 100 to be tested is shown in FIG. 20. The network apparatus 100 includes a first conversion portion 110, a first check circuit 111, a second conversion portion 120, and a second check circuit 121. In FIG. 20, the ports 101-104 are not shown. Further, a tester 130 that tests the first check circuit 111 and the second check circuit 121 is connected to the network apparatus 100 shown in FIG. 20.

The first conversion portion 110 has a first routing table 112 in it, and converts the header a in the transfer data 105 into the header b based on the first routing table 112, as described above with reference to FIGS. 18 and 19.

The first routing table 112 retains the header a and header b in a condition where the contents of the headers are correlated with each other. The first routing table 112 is configured so that the contents of the header b may be searched by using the contents of the header a as a search key. Instead of retaining all the contents of the headers a and b as the contents of the header a, the first routing table 112 may retain "layer-2 transmission source network address (AAAAAAAA)" and "layer-2 destination network address (BBBBBBBB)" as the contents of the header a. The first routing table 112 may also retain "intra-apparatus input port number (#1)" and "intra-apparatus destination port number (#3)" in a condition where they are correlated with each other respectively.

The first conversion portion 110 searches the first routing table 112 by using the header a as a keyword and rebuilds the header a into the header b based on the contents of the header b obtained as a result of the search.

The first check circuit 111 is used to check search processing, in other words, conversion processing by the first conversion portion 110 and the validity of the contents of the header b.

The first check circuit 111 checks on whether search processing by the first conversion portion 110 is normally performed and whether results of the search are normal, based on the search results.

The first check circuit 111 discards relevant transfer data, in other words, abnormal data, if the search processing by the first conversion portion 110 is determined to have been performed abnormally as a result of the check. The first check circuit 111 also discards relevant transfer data if the search results are determined to be abnormal as shown in FIGS. 21A and 21B. On the other hand, transfer data on which the search results have been determined as being normal, that is, normal data, is transmitted to a subsequent stage by the first check circuit 111 ordinarily.

An example shown in FIG. 21A indicates a case where an abnormal data piece p and normal data pieces q, r, and s pass through the first check circuit 111 sequentially. In this case, the first check circuit discards only abnormal data p in the top and transfers the remaining normal data pieces q, r, and s as shown in FIG. 21B.

Abnormal data refers to data that should be discarded by the first check circuit 111 or the second check circuit 121 because its header contents are inappropriate.

On the other hand, normal data refers to data that should not be discarded by the first check circuit 111 or the second check circuit 121 because its header contents are appropriate.

The second conversion portion 120 has a second routing table 122. The second conversion portion 120 converts the header b in the transfer data 106 into the header c based on this second routing table 122, as described above with reference to FIGS. 18 and 19.

The second routing table 122 retains the headers b and c in a condition where their contents are correlated with each other. The second routing table 122 is configured so that the contents of the header c may be searched by using the contents of the header b as a search key. Instead of retaining all the contents of the headers b and c, the second routing table 122 may retain "intra-apparatus input port number (#1)" and "intra-apparatus destination port number (#3)" as the contents of the header b, and "layer-2 transmission source network address (XXXXXXXX)" and "layer-2 destination network address (YYYYYYYY)" as the contents of the header c in a condition where they are correlated with each other respectively.

The second conversion portion 120 searches the second routing table 122 by using the header b as a keyword. The second conversion portion 120 rebuilds the header b into the header c based on the contents of the header c obtained as a result of the search.

The second check circuit 121 is used to check search processing by the second conversion portion 120 and the validity of the contents of the header c.

That is, the second check circuit 121 checks on whether search processing by the second conversion portion 120 is normally performed and whether results of the search are normal, based on the search results.

The second check circuit 121 discards relevant transfer data like the first check circuit 111 if the search processing by the second conversion portion 120 is determined to have been abnormally performed as a result of the check. The second check circuit 121 also discards relevant transfer data if the search results are determined to be abnormal as shown in FIGS. 21A and 21B. On the other hand, transfer data on which the search processing by the second conversion portion 120 has been normally performed is transmitted to a subsequent stage by the second check circuit 121.

If any of the first check circuit 111 or the second check circuit 121 determines, as a result of checking, that the search processing or the transfer data is abnormal, the network apparatus 100 discards relevant transfer data to thereby prevent incorrect data from being propagated to an adjacent apparatus connected to it.

For example, if a search of the routing table by the first conversion portion 110 or the second conversion portion 120 is unsuccessful due to a fault in the network apparatus 100, the first check circuit 111 and second check circuit 121 use their check functions to thereby decide that data concerned is abnormal and discard the abnormal data.

Therefore, to realize stable operations of the network, conventionally, the tester 130 is equipped to test whether the first check circuit 111 and the second check circuit 121 are normal.

As shown in FIG. 20, for example, the tester 130 inputs the transfer data 105 containing the header a to the network apparatus 100 as test data. The tester 130 checks the first check circuit 111 and the second check circuit 121 based on the output transfer data 107 obtained by conversion in this network apparatus 100.

Japanese Patent Application Laid-Open No. 07-95236 discloses technologies that connect a packet exchange test apparatus to a device under test. The patent exchange test apparatus exchanges packets and exhaustively verifies a circuit which realizes a function to discard incorrect data based on header building rules in the device under test.

SUMMARY

However, if either the check circuit 111 or the check circuit 121 is abnormal, the check circuit tester 130 in the network apparatus 100 cannot know which either the check circuit 111 or the check circuit 121 is abnormal, that is, the network apparatus 100 cannot locate a faulty point.

The inside of the network apparatus 100 is a black box as viewed from the external tester 130. Therefore, the tester 130 cannot identify the check circuit that has discarded the test data if no output is given by the network apparatus in response to input test data and relevant test data is discarded.

If incorrect test data that cannot be converted by the first conversion portion 110 based on the first routing table 112 is input from the tester 130 into the network apparatus 100 and, if no transfer data is output from the network apparatus 100 in response to the test data, the tester 130 cannot identify a reason for such situation. That is, the tester 130 cannot identify whether the test data is discarded by the first check circuit 111, or the test data is discarded by the second check circuit 121 because the first check circuit 111 was faulty.

Further, when the first check circuit 111 is normal and if test data is discarded by the first check circuit 111, the tester 130 cannot test the second check circuit 121 only by inputting incorrect data into the network apparatus 100.

Furthermore, recent improvements in data transfer performance of the network apparatus 100 have brought about better burstiness of traffic related to transfer data, thus resulting in a decrease in inter-transfer data gap. Therefore, a check circuit also needs to reduce processing time required for each piece of transfer data and decrease a timing margin.

However, as shown in FIGS. 22A and 22B, the decrease in timing margin will lead to an insufficiency of a timing margin required to sort normal and abnormal operations from each other in the check circuits 111 or 121. That is, an insufficient timing margin required to switch between processing to transmit transfer data and processing to discard it. Accordingly, before the processing to discard incorrect data piece p is completed, the processing of the subsequent normal data piece q starts, so that the normal data piece q may be discarded by mistake owing to an error in sorting.

As shown in FIG. 22A, if an incorrect data piece p and normal data pieces q and r are being transferred sequentially, and if the timing margin required to sort normal and abnormal operations from each other of the check circuits 111 or 121 is not sufficient, as shown in FIG. 22B, the processing of normal data q that is immediately subsequent to incorrect data piece p starts before the incorrect data piece p is discarded completely. Therefore, the normal data piece q will not be sorted correctly and may be discarded unintentionally.

Therefore, in order to decide whether a timing margin is appropriate for each of the check circuits 111 and 121 in the network apparatus 100, it is necessary to confirm that the check circuits 111 and 121 will operate normally for burst traffic. However, the conventional tester 130 has not been able to perform such confirmation test.

It is an object of one aspect of the present invention to enable identifying an abnormal check circuit in a network apparatus.

It is an object of another aspect of the present invention to enable performing confirmation processing on burst traffic of a check circuit.

One aspect of the present invention provides a relay device connected to a plurality of devices, for relaying transfer data to be transmitted between the devices, the relay device comprising a plurality of testers, each of which determines whether received transfer data is normal or not, and discards the transfer data that is determined abnormal, a counter that counts a number of transfer data discarded by each of the testers respectively, and a determiner that determines whether an operation of each tester is normal or not based on the number of discarded transfer data counted by the counter.

Another aspect of the present invention provides a relay device connected to a plurality of devices for relaying transfer data to be transmitted between the devices, the relay device comprising a first table that contains a first header information of a transfer data and a relaying header information corresponding to the first header, a first converter that converts first header information of the transfer data input to the relay device into a corresponding relaying header information based on information contained in the first table, a first tester that determines whether transfer data in which header information is converted by the first converter is normal or not, a second table contains a relaying header and a second header information corresponding to the relaying header, a second converter that converts the relaying header information of the transfer data converted by the first converter into a corresponding relaying header information based on information contained in the second table, a second tester that determines whether transfer data in which header information is converted by the second converter is normal or not, a setter that sets a pair of header information in which converted header information should be determined as abnormal into the first table or the second table, and a determiner that determines whether an operation of the first tester and the second tester is normal or not based on a result of determination by the first tester and the second tester.

The above-described embodiments of the present invention are intended as examples, and all embodiments of the present invention are not limited to including the features described above.

BRIEF DESCRIPTION OF THE DRAWINGS

FIG. 18 is an explanatory diagram of an example of rebuilding of a header in a conventional network apparatus;

FIG. 19 shows one example of the contents of the header which is rebuilt in the conventional network apparatus;

FIG. 21 is an explanatory diagram of operations of a check circuit in the conventional network apparatus.

DETAILED DESCRIPTION OF THE PREFERRED EMBODIMENTS

Figure 1:
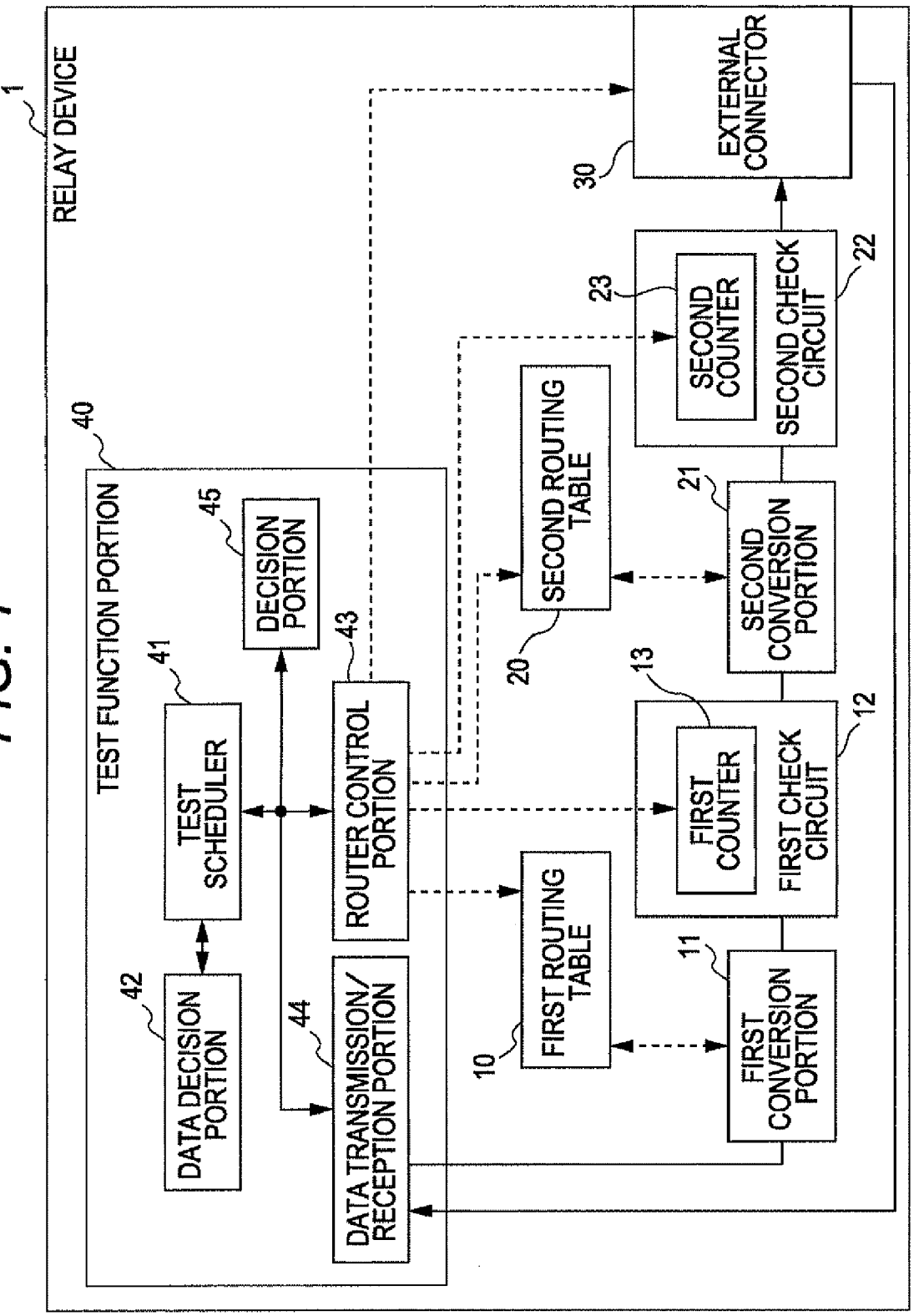
FIG. 1 is a block diagram of a constitution of a relay device according to one embodiment of the present invention.

Reference may now be made in detail to embodiments of the present invention, examples of which are illustrated in the accompanying drawings, wherein like reference numerals refer to like elements throughout.

Embodiments of the present invention are described with reference to the drawings.

First, one embodiment of a relay device 1 will be described below with reference to a block diagram shown in FIG. 1. In FIG. 1, a solid-line arrow indicates a flow of data and a dotted-line arrow indicates hardware access. The relay device 1 shown in FIG. 1 has a plurality of ports (not shown) to which a plurality of apparatuses is connected respectively. The relay device 1 relays transfer data which is transmitted and received between the plurality of apparatuses. Further, the relay device 1 is equipped with a first routing table 10, a first conversion portion 11, a first check circuit 12, a second routing table 20, a second conversion portion 21, a second check circuit 22, an external connector 30, and a testing portion 40. The testing portion 40 functions as a test apparatus.

The first routing table 10 retains header information. The header information is contained in transfer data to be transferred from one of the plurality of apparatuses to another in a condition where the header information is correlated with relaying header information. The relaying header information is information peculiar to the relay device 1. The relaying header information is required to transfer the transfer data in the relay device 1 from a port to which the transmission source apparatus is connected to a port to which the transfer destination apparatus is connected. Header information contained in transfer data is hereinafter referred to as "first header information".

To transfer data in the relay device 1, the first conversion portion 11 converts first header information contained in the transfer data into relaying header information based on the first routing table 10.

The first conversion portion 11 searches the first routing table 10 by using the contents of the first header information in the input transfer data as a search key. The first conversion portion 11 converts relaying header information corresponding to the first header information retrieved from the first routing table 10 into header information of relevant transfer data.

The first check circuit 12 checks on whether a result of conversion by the first conversion portion 11 is normal. The first check circuit 12 discards the transfer data that relates to the conversion result determined as being abnormal. If having determined the conversion result as being normal, the first check circuit 12 transmits the relevant transfer data to a subsequent stage component.

The first check circuit 12 determines whether conversion processing is normally performed by the first conversion portion 11 and whether a result of the conversion is normal, based on whether the header information in the transfer data falls in a predetermined data range.

If the relaying header information obtained as a result of the conversion falls in a preset prescriptive range, the first check circuit 12 determines that the result of conversion by the first conversion portion 11 is normal. On the other hand, if the relaying header information falls outside the preset prescriptive range, the first check circuit 12 determines that the result of conversion by the first conversion portion 11 is abnormal.

Further, the first check circuit 12 is equipped with a first counter 13. The first counter 13 counts transfer data pieces discarded by the first check circuit 12. Therefore, the first counter 13 functions as a discard counter.

The second routing table 20 retains relaying header information and header information required to transfer the transfer data to any other destination apparatus in a condition where they are correlated with each other. Header information which is retained in the second routing table 20 is hereinafter referred to as "second header information".

To transmit data to the network, the second conversion portion 21 converts relaying header information contained in transfer data into second header information based on the second routing table 20.

The second conversion portion 21 searches the second routing table 20 by using the contents of relaying header information as a search key. The second conversion portion 21 converts second header information corresponding to the relaying header information retrieved from the second routing table 20 into header information of relevant transfer data.

The second check circuit 22 checks on whether a result of conversion by the second conversion portion 21 is normal.

The second check circuit 22 discards the transfer data that relates to the conversion result decided as being abnormal. If having decided the conversion result as being normal, the second check circuit 22 transfers the relevant transfer data.

The second check circuit 22 determines whether conversion processing is normally performed by the second conversion portion 21 and whether a result of the conversion is normal, based on whether the second header information in the transfer data falls in a predetermined data range.

If the second header information obtained as a result of the conversion falls in a preset prescriptive range, the second check circuit 22 determines that the results of conversion by the second conversion portion 21 is normal. On the other hand, if the second header information falls outside the preset prescriptive range, the second check circuit 22 determines that the result of conversion by the second conversion portion 21 is abnormal.

The second check circuit 22 is equipped with a second counter 23. The second counter 23 counts transfer data pieces discarded by the second check circuit 22. Therefore, like the first counter 13, the second counter 23 functions as a discard counter.

The external connector 30 is used to output transfer data to the outside of the relay device 1. The external connector 30 has a loop-back function in that it loops back transfer data which has passed through the second check circuit 22 to the testing portion 40, under the control of a router control portion 43 in the testing portion 40.

The testing portion 40 tests the first check circuit 12 and the second check circuit 22. Hereinafter, the first check circuit 12 and the second check circuit 22 may generally be referred to as a "check circuit". The testing portion 40 includes a test scheduler 41, a data determination portion 42, the router control portion 43, a data transmission/reception portion 44, and a decision portion 45.

The test scheduler 41, the data determination portion 42, and the data transmission/reception portion 44 in the testing portion 40 function as a first test transfer data input portion, a second test transfer data input portion, a third test transfer data input portion, and a fourth test transfer data input portion respectively.

Further, the test scheduler 41 and the data router control portion 43 in the testing portion 40 function as a first conversion table setting portion and a second conversion table setting portion respectively.

Furthermore, the functions of the testing portion 40, that is, the functions of the test scheduler 41, the data determination portion 42, the router control portion 43, the data transmission/reception portion 44, and the decision portion 45 are realized by a computing unit such as a CPU (not shown) of the relay device 1 when it executes a predetermined application program such as a test program, which will be described later.

The test scheduler 41 schedules tests, to control the data determination portion 42, the router control portion 43, and the data transmission/reception portion 44 so that the first check circuit 12 and the second check circuit 22 may be tested.

The test scheduler 41 controls the data determination portion 42, the router control portion 43, and the data transmission/reception portion 44 in order to realize test procedures shown respectively in FIGS. 2, 3, 7, 9, and 12 to be described later.

The data determination portion 42 determines table data to be set in the first routing table 10 and the second routing table 20 as well as test data to be input into the relay device 1.

For example, an operator who conducts a test of the relay device 1 provides test data to be transmitted and the corresponding table data beforehand. The data determination portion 42 determines appropriate data in accordance with the contents of these provided data pieces. A pair of first header information and relaying header information is provided as the table data to the first routing table 10, while a pair of relaying header information and second header information is provided to the second routing table 20.

The contents of the test data and table data will be determined by the data determination portion 42 in accordance with the check circuits 12 and 22 to be tested, as well as the purposes of the tests and described in detail below with reference to FIGS. 5, 8,10, and 13 to be described later.

The router control portion 43 controls the first routing table 10, the first counter 13, the second routing table 20, the second counter 23, and the external connector 30.

The router control portion 43 registers or deletes table data for each of the first routing table 10 and the second routing table 20.

Also, the router control portion 43 reads or clears (resets) a counter value of each of the first counter 13 and the second counter 23.

Further, the router control portion 43 sets or cancels the loop-back function of the external connector 30.

The data transmission/reception portion 44 transmits and receives data to/from a main signal path (not shown) of the relay device 1. Test data is input into the first conversion portion 11 from an input path connected to the port so that first through fourth test transfer data pieces may be handled as having been input from the port to which the external apparatus is connected in the relay device 1.

Further, the data transmission/reception portion 44 receives transfer data to be output from the external connector 30. This can be done on condition that the external connector 30 has been set for loop-back by the router control portion 43.

The decision portion 45 determines whether the check circuits 12 and 22 are each normal in operation based on a test schedule set by the test scheduler 41, values of the first and second counters 13 and 23 read by the router control portion 43, and data received by the data transmission/reception portion 44 via the external connector 30. The test schedule contains test data determined by the data determination portion 42 and transmitted by the data transmission/reception portion 44 and table data set by the router control portion 43.

The contents of specific processing by the decision portion 45 will be described in detail below with reference to FIGS. 3, 7, 9, and 12 to be described later.

Then, the results of test by the testing portion 40 and decision by the decision portion 45 are output to the outside from an output terminal (not shown) of the relay device 1.

A procedure of tests conducted by the testing portion 40 in the relay device will be outlined below with reference to a flowchart shown in FIG. 2.

First, the testing portion 40 conducts a test on whether the first check circuit 12 is normal in operation (S10).

If the first check circuit 12 is found to be abnormal in operation (NO at S10), for example, the operator conducts repair or replacement on the first check circuit 12 (S10'), and then the testing portion 40 conducts a test on the first check circuit 12 again (S10).

On the other hand, if the first check circuit 12 is found to be normal (YES at S10), the testing portion 40 conducts a test on whether the second check circuit 22 is normal (S20).

If the second check circuit 22 is found to be abnormal (NO at S20), the operator conducts repair or replacement on the second check circuit 22 (S20'), and then the testing portion 40 conducts a test on the second check circuit 22 again (S20).

On the other hand, if the second check circuit 22 is found to be normal (YES at S20), the testing portion 40 conducts an operation confirmation test on burst traffic of the first check circuit 12 (S30).

If transfer data discard processing for burst traffic of the first check circuit 12 is found to be abnormal (NO at S30), the operator adjusts a timing margin of the first check circuit 12 (S30'), and then an operation confirmation test is conducted again on burst traffic of the first check circuit 12 (S30).

On the other hand, if transfer data discard processing for burst traffic of the first check circuit 12 is found to be normal (YES at S30), the testing portion 40 conducts an operation confirmation test on burst traffic of the second check circuit 22 (S40).

If transfer data discard processing for burst traffic of the second check circuit 22 is found to be abnormal (NO at S40), for example, the operator adjusts a timing margin of the second check circuit 22 (S40'). Then an operation confirmation test is conducted again on burst traffic of the second check circuit 22 (S40).

On the other hand, if transfer data discard processing for burst traffic of the second check circuit 22 is found to be normal (YES at S40), the testing portion 40 ends its processing.

Next, the detailed functions of each of the components 41-45 of the testing portion 40 and a procedure of conducting a test on the first check circuit 12 by the testing portion 40, that is, the contents of processing of S10 in FIG. 2 will be described in detail below with reference to a flowchart shown in FIG. 3.

First, the test scheduler 41 permits the data determination portion 42 to determine correspondence between first header information and incorrect relaying header information that should be decided by the first check circuit 12 as being abnormal, as table data to be registered in the first routing table 10. Then, the test scheduler 41 permits the router control portion 43 to register the table data, which the correspondence is determined, in the first routing table 10 (S11).

Figure 4:
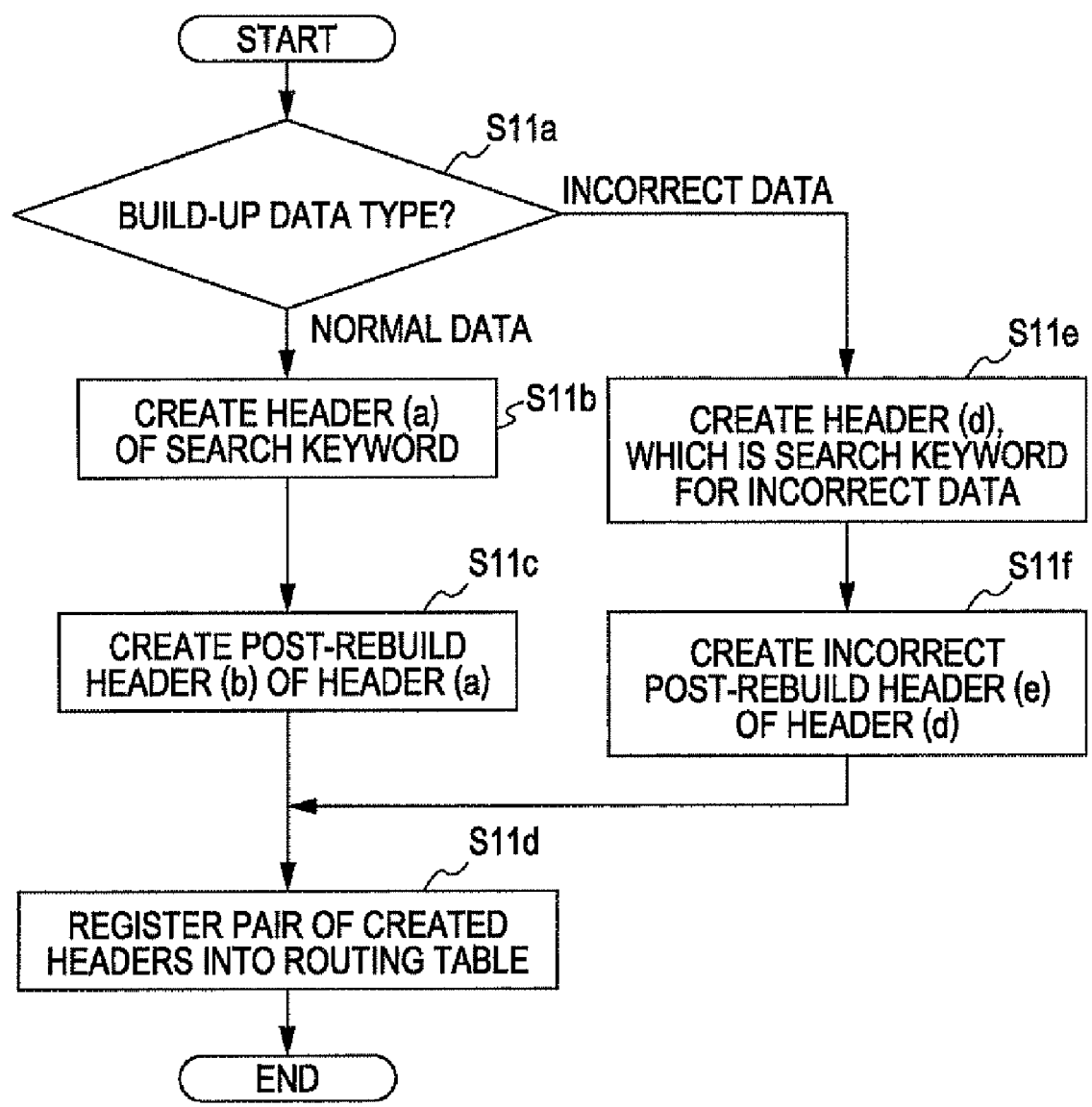
FIG. 4 is a flowchart of a data determination procedure of a data determination portion in the testing portion in the relay device.

The procedure of the processing by the data determination portion 42 and the router control portion 43 will be described below with reference to a flowchart shown in FIG. 4. The data determination portion 42 determines a build-up data type specified by the test scheduler 41 (S11a). If the specified build-up data type is of normal data ("Normal data" at S11a), the data determination portion 42 creates a header (a), which is a search keyword, as the first header information (S11b). Further, the data determination portion 42 creates a header (b), which is obtained after the header (a) is rebuilt up, as the relaying header information (S11c).

Then, the router control portion 43 registers a pair of the header (a) and the header (b) in the first routing table 10 (S11d) and ends the processing.

On the other hand, if the build-up data type specified by the test scheduler 41 is of incorrect data ("Incorrect data" at S11a), it creates a header (d), which is a search keyword for the incorrect data, as the first header information (S11e). Further, the data determination portion 42 creates a header (e), which is obtained after the header (d) is rebuilt up, as the relaying header information (S11f).

Subsequently, the router control portion 43 registers a pair of the header (d) and the header (e) in the first routing table 10 (S11d) and ends the processing.

Figure 3:
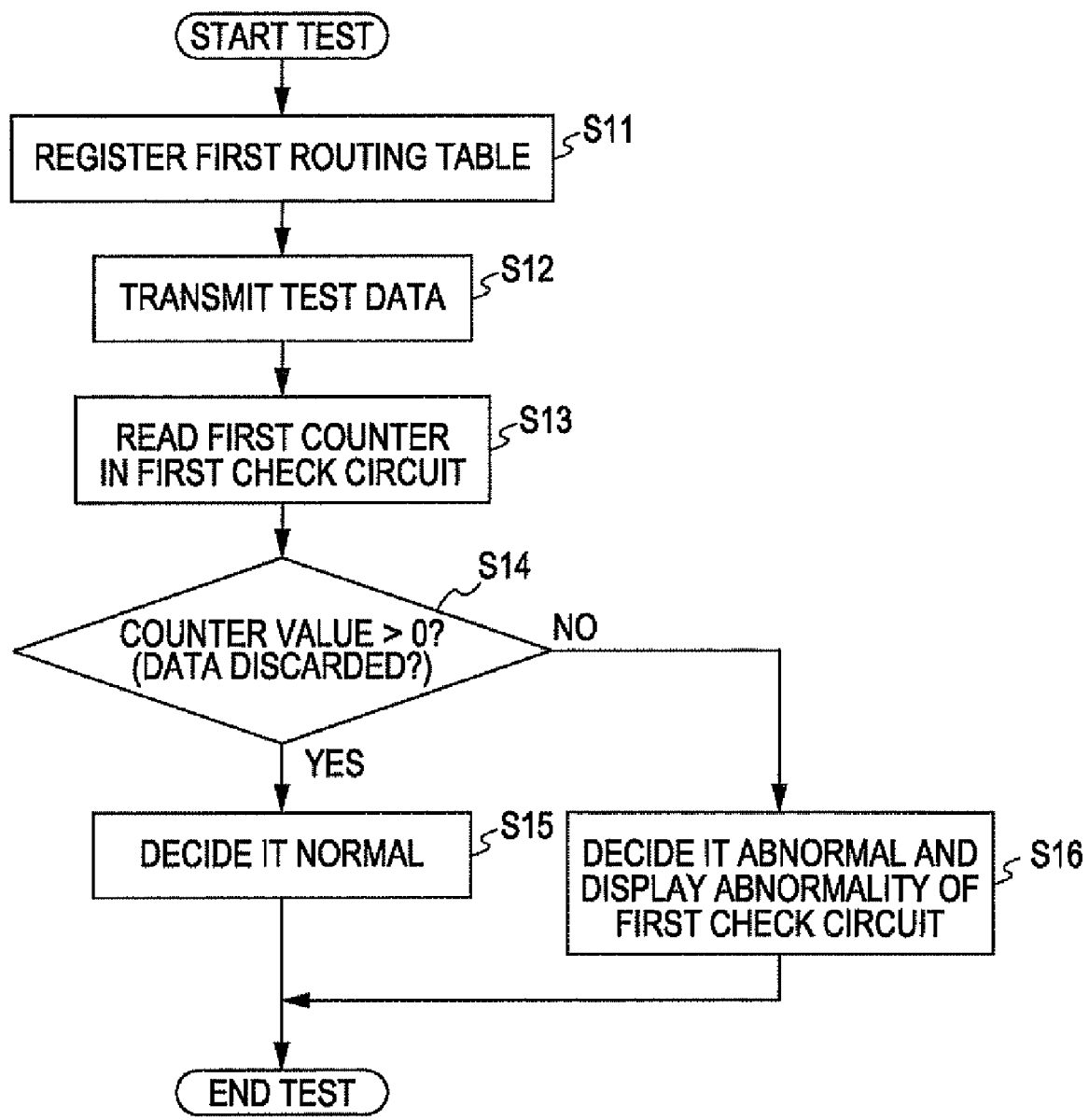
FIG. 3 is a flowchart of a processing procedure of test of a first check circuit by a testing portion in the relay device.
Figure 5:
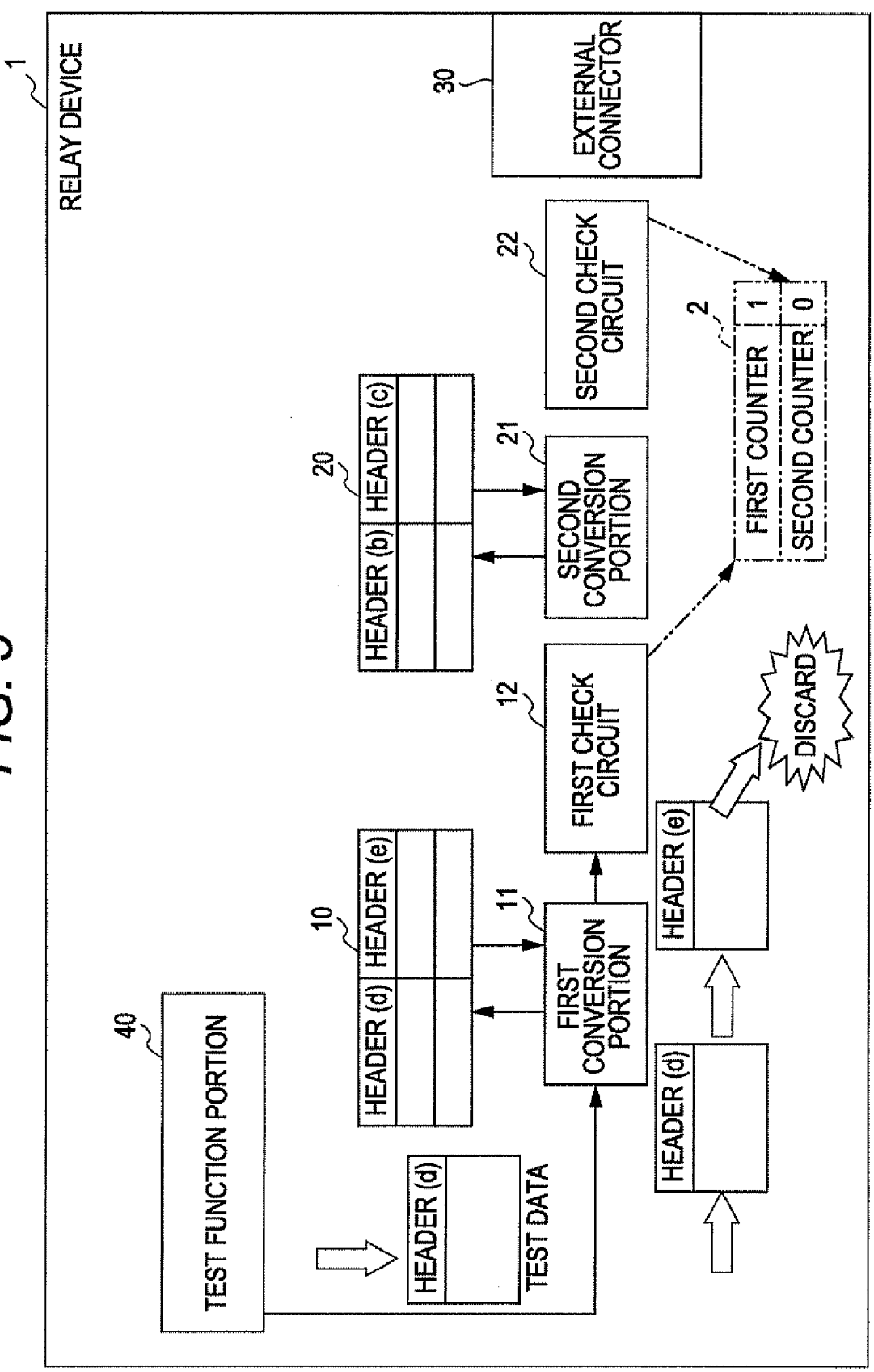
FIG. 5 is an explanatory diagram of the contents of a test of a first check circuit by the testing portion in the relay device.

Then, at S11 in FIG. 3, as shown in FIG. 5, for example, the header (d) and the header (e) are registered as the first header information and the relaying header information respectively in the first routing table 10.

In such a manner, the test scheduler 41, the data determination portion 42, and the router control portion 43 function as a first conversion table setting portion that sets incorrect relaying header information in the first routing table 10.

Subsequently, the test scheduler 41 permits the data determination portion 42 to determine, as test data, such data as to contain the first header information that corresponds to the incorrect relaying header information set and registered in the first routing table 10 and permits the data transmission/reception portion 44 to transmit this determined test data to the first conversion portion 11 (S12). In this case, the data transmission/reception portion 44 is controlled by the test scheduler 41, to input only one piece of the test data to the first conversion portion 11. In an example of FIG. 5, the data determination portion 42 determines data which contains the header (d) and is registered in the first routing table 10, as the test data.

The test scheduler 41, the data determination portion 42, and the data transmission/reception portion 44 function as a first test transfer data input portion that inputs transfer data containing the first header information that corresponds to the incorrect relaying header information into the first conversion portion 11 as test data.

Then, after a predetermined time elapses since the test data is input by the data transmission/reception portion 44, the test scheduler 41 permits the router control portion 43 to read a value of the first counter 13 in the first check circuit 12 (S13). Upon starting the present test, the first counter 13 is reset to 0 by the test scheduler 41 and the router control portion 43.

Next, the decision portion 45 decides whether the value of the first counter 13 read by the router control portion 43 is at least 1, that is, whether data is discarded by the first check circuit 12 and, based on a result of this decision, decides whether the first check circuit 12 is normal (S14).

The decision portion 45 decides whether the first check circuit 12 is normal based on the value of the first counter 13 and the number of test data pieces input by the test scheduler 41, the data determination portion 42, and the data transmission/reception portion 44.

In this case, the number of the test data pieces is 1, so that the decision portion 45 decides only whether the value of the first counter is at least 1.

Figure 6:
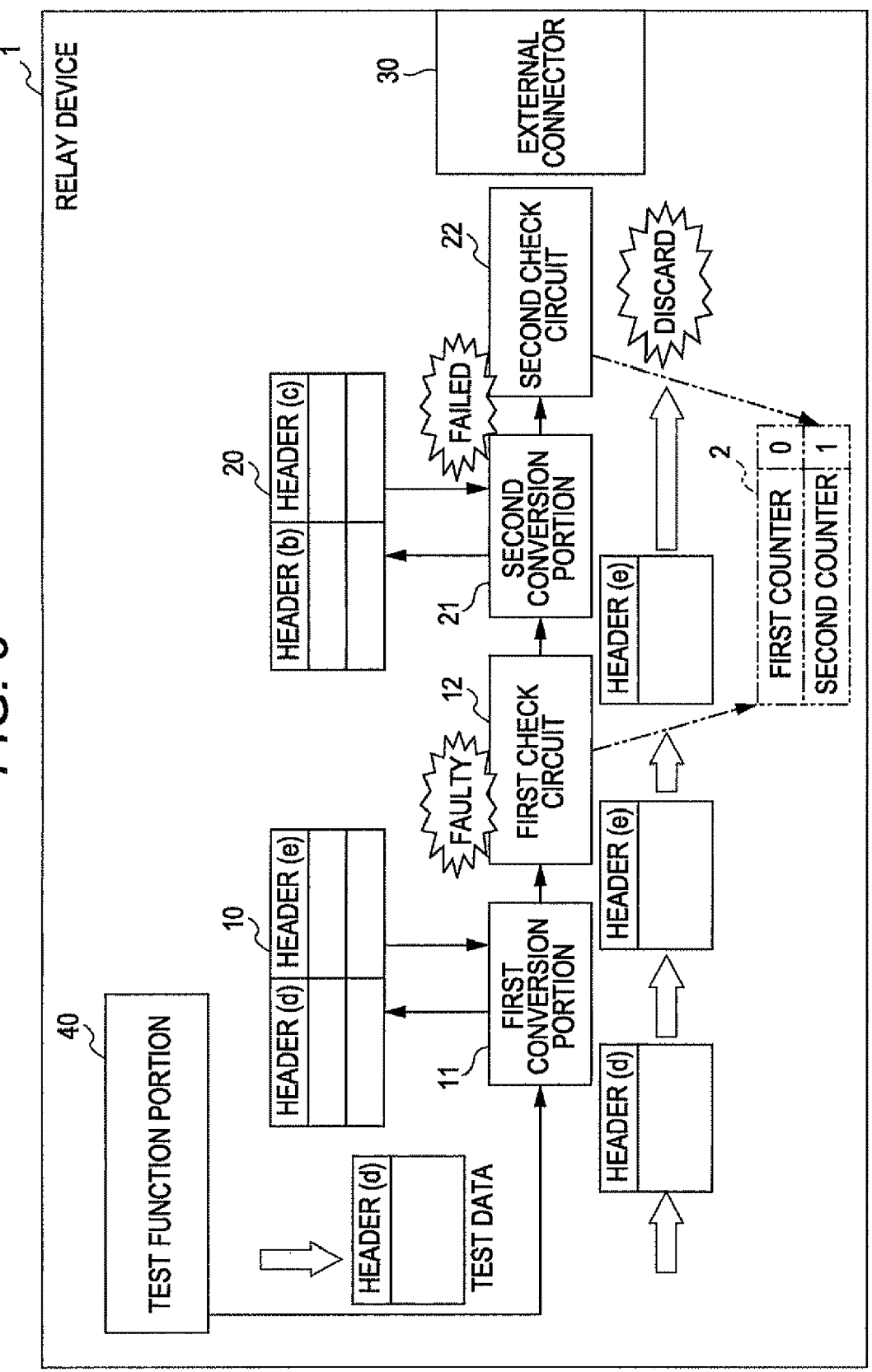
FIG. 6 is an explanatory diagram of the contents of a different test of the first check circuit by the testing portion in the relay device.

If the value of the first counter 13 is at least 1, that is, if the number of the test data pieces agrees with the value of the first counter 13 (YES at S14), the decision portion 45 decides that the first check circuit 12 is normal (S15). If the first check circuit 12 is operating normally, incorrect test data is discarded by the first check circuit 12, so that the value of the first counter 13 will be at least 1. In FIG. 5 and FIG. 6, Table 2 enclosed by a dash-and-two-dots line indicates the values of the respective first counter 13 and second counter 23 during test.

On the other hand, as shown in FIG. 6, if the value of the first counter 13 is 0, that is, if the number of the test data pieces disagrees with the value of the first counter 13 (NO at S14), the decision portion 45 decides that the first check circuit 12 is abnormal. If the value of the first counter 13 stays at 0 despite the transmission of incorrect test data, it means that the first check circuit 12 is yet to discard the incorrect test data. In this case, it indicates the abnormality of the first check circuit 12 on an external display screen (not shown) of the relay device 1 or a display screen (not shown) of the relay device 1 (S16) and ends the processing.

In such a manner, according to the testing portion 40, test data, which should be decided by the first check circuit 12 as being abnormal, is input based on a value of the first counter 13 at this point in time, the first check circuit 12 is decided on whether it is normal. It is thus possible to surely decide whether the first check circuit 12 is normal.

Subsequently, the detailed functions of each of the components 41-45 of the testing portion 40 and a procedure of conducting a test on the second check circuit 22 by the testing portion 40, that is, the contents of processing of S20 in FIG. 2 will be described in detail below with reference to a flowchart shown in FIG. 7.

First, the test scheduler 41 permits the data determination portion 42 to determine correspondence between first header information and normal relaying header information that should be decided by the first check circuit 12 as being normal, as table data to be registered in the first routing table 10. Then, the test scheduler 41 permits the router control portion 43 to register the table data, which the correspondence is determined, in the first routing table 10 (S21). Data determination portion 42 and the router control portion 43 perform the processing also at S21 and the later described operation of S21 in the same or roughly the same way as the method described in the above FIG. 4.

Figure 8:
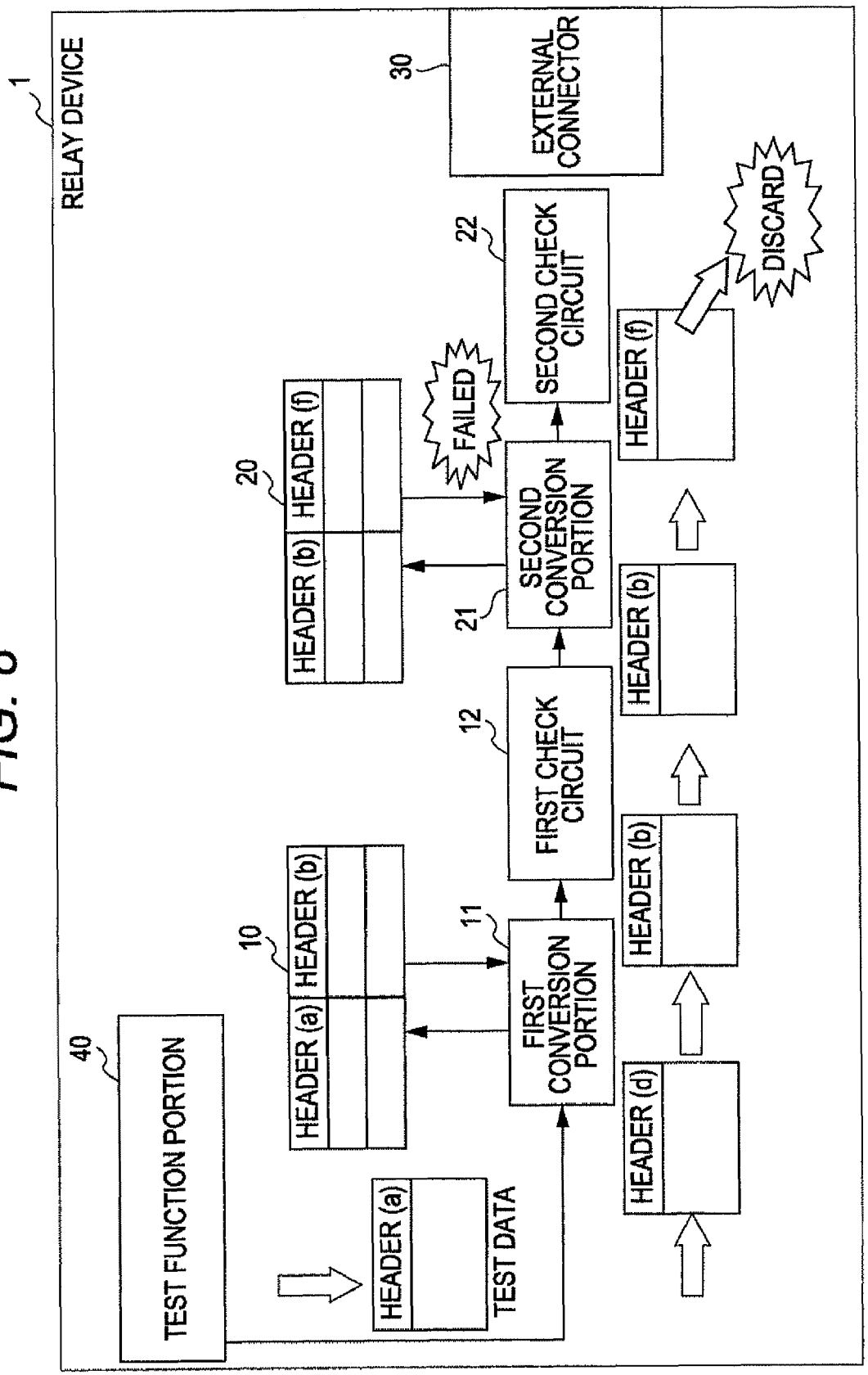
FIG. 8 is an explanatory diagram of the contents of a test of the second check circuit by the testing portion in the relay device.

In this case, as shown in FIG. 8, the data determination portion 42 determines a pair of a header (a) as the first header information and a header (b) as the normal relaying header information. This pair of headers determined by the data determination portion 42 is registered by the router control portion in the first routing table 10 as the table data.

Furthermore, the test scheduler 41 permits the data determination portion 42 to determine correspondence between incorrect second header information that should be determined in the second check circuit 22 as being abnormal, and the relaying header information registered in the first routing table 10 at operation S21 as table data to be registered in the second routing table 20. Then, the test scheduler 41 permits the router control portion 43 to register the incorrect table data, which the correspondence is determined, in the second routing table 20 (S22).

As shown in FIG. 8, the data determination portion 42 determines a pair of a header (f) as the second header information, which is incorrect data, and the header (b) as the relaying header information. Then, the router control portion 43 registers the pair of headers determined by the data determination portion 42 in the second routing table 20 as table data.

In such a manner, the test scheduler 41, the data determination portion 42, and the router control portion 43 function as a second conversion table setting portion that sets incorrect second header information containing information that should be determined by the second check circuit 22 as being abnormal in the second routing table 20.

Next, the test scheduler 41 permits the data determination portion 42 to determine data as to contain the first header information (header (a)) to be converted into the incorrect second header information (header (f)) by the second conversion portion 21, as test data. Then, the test scheduler 41 permits the data transmission/reception portion 44 to transmit the test data determined by the data determination portion 42 to the first conversion portion 11 (S23). In this case, the data transmission/reception portion 44 is controlled by the test scheduler 41, to input only one piece of the test data to the first conversion portion 11.

The test scheduler 41, the data determination portion 42, and the data transmission/reception portion 44 function as a second test transfer data input portion that inputs transfer data containing the first header information to be converted by the second conversion portion 21 into incorrect second header information into the first conversion portion 11 as test data.

Thus, as shown in FIG. 8, in the relay device 1, a header (a) is converted by the first conversion portion 11 into a header (b) based on the first routing table 10, and is input into the first check circuit 12. In this case, the header (b) is normal header information, so that the result of conversion by the first conversion portion 11 is determined by the first check circuit 12 as being normal and input into the subsequent stage second conversion portion 21. Then, the header (b) is converted by the second conversion portion 21 into an incorrect header (f) based on the second routing table 20, and is checked in the second check circuit 22.

Figure 2:
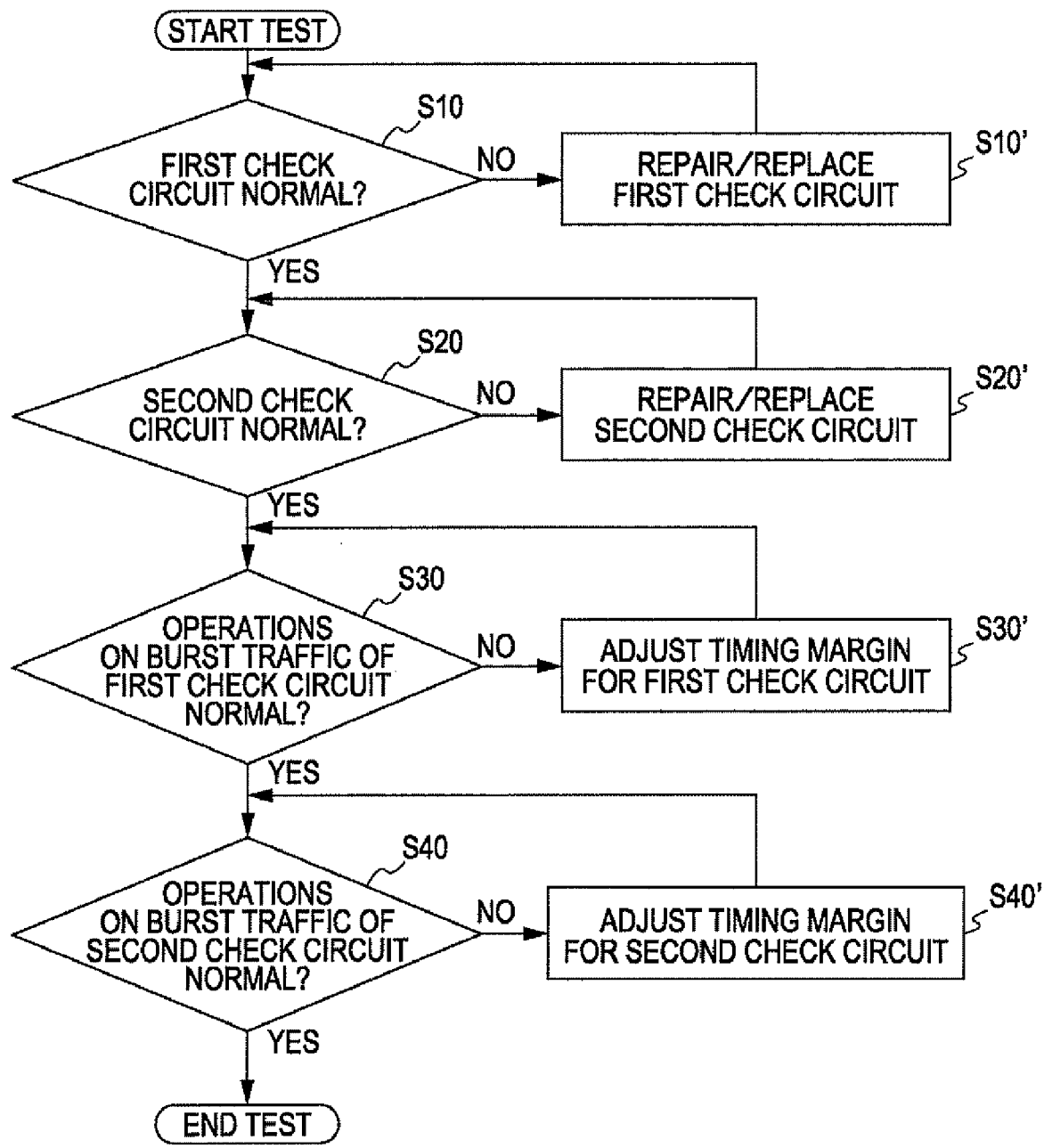
FIG. 2 is a flowchart of an operation procedure of a test method according to the embodiment.

Since the first check circuit 12 is already checked to be normal at S10 in FIG. 2, the header (b) will be input into the second conversion portion 21 for sure.

Then, after a predetermined time elapses after the test data is input by the data transmission/reception portion 44, the test scheduler 41 permits the router control portion 43 to read a value of the second counter 23 in the second check circuit 22 (S24). Upon starting the present test, the first counter 13 and the second counter 23 are reset to 0 by the test scheduler 41 and the router control portion 43.

Subsequently, the decision portion 45 decides whether the value of the second counter 23 read by the router control portion 43 is at least 1, that is, whether data is discarded by the second check circuit 22 and, based on a result of this decision, decides whether the second check circuit 22 is normal (S25).

The decision portion 45 decides whether the second check circuit 22 is normal or not based on whether a conversion result relating to the relevant test data is discarded by the second check circuit 22.

In this case, the number of the test data pieces is 1, so that the decision portion 45 decides only whether the value of the second counter 23 is at least 1.

If transfer data containing the incorrect header (f) is normally discarded by the second check circuit 22, the count value of the second counter 23 is at least 1. Therefore, if the value of the second counter 23 is at least 1, that is, if the number of the test data pieces agrees with the value of the second counter 23 (YES at S25), the decision portion 45 decides that the second check circuit 22 is normal (S26).

On the other hand, if the value of the second counter 23 is 0, that is, if the number of the test data pieces disagrees with the value of the second counter 23 (NO at S25), it means that the second check circuit 22 is yet to discard the transfer data of the header (f), so that the decision portion 45 decides that the second check circuit 22 is abnormal. In this case, the decision portion 45 indicates the abnormality of the second check circuit 22 on the external display screen of the relay device 1 or the display screen of the relay device 1 (S27) and ends the processing.

In such a manner, according to the testing portion 40, test data which should be decided to be abnormal by the second check circuit 22 is input after the first check circuit 12 is confirmed to be normal, and based on a value of the second counter 23, the second check circuit 22 is decided on whether it is normal or not. It is thus possible to surely decide whether the second check circuit 22 is normal.

Next, the detailed functions of each of the components 41-45 of the testing portion 40, and a procedure of conducting a test on burst traffic of the first check circuit 12 by the testing portion 40, that is, the contents of processing of S30 in FIG. 2, will be described in detail below with reference to a flowchart shown in FIG. 9 and FIG. 10.

First, the test scheduler 41 permits the data determination portion 42 to determine a pair of normal relaying header information (header (b)) determined to be normal by the first check circuit 12 and first header information (header (a)), as table data to be registered in the first routing table 10. Further, the test scheduler 41 permits it to determine a pair of first header information (header (d)) and incorrect relaying header information (header (e)) which should be determined to be abnormal by the first check circuit 12. Then, the test scheduler 41 permits the router control portion 43 to register these table data pieces in the first routing table 10 (S31). Data determination portion 42 and the router control portion 43 perform the processing also at S31 and the later described operation of S32 in the same or roughly the same way as the method described in the above FIG. 4.

In such a manner, the test scheduler 41, the data determination portion 42, and the router control portion 43 function as a first conversion table setting portion that sets incorrect relaying header information that should be decided to be abnormal by the second check circuit 12, in the first routing table 10.

Subsequently, the test scheduler 41 permits the data determination portion 42 to determine, as table data to be registered in the second routing table 20, a pair of relaying header information (header (b)) which corresponds to the normal table data registered at operation S31 and normal second header information (header (c)) decided to be normal by the second check circuit 22. Then, the test scheduler 41 permits the router control portion 43 to register the table data determined by the data determination portion 42 in the second routing table 20 (S32).

Figure 11:
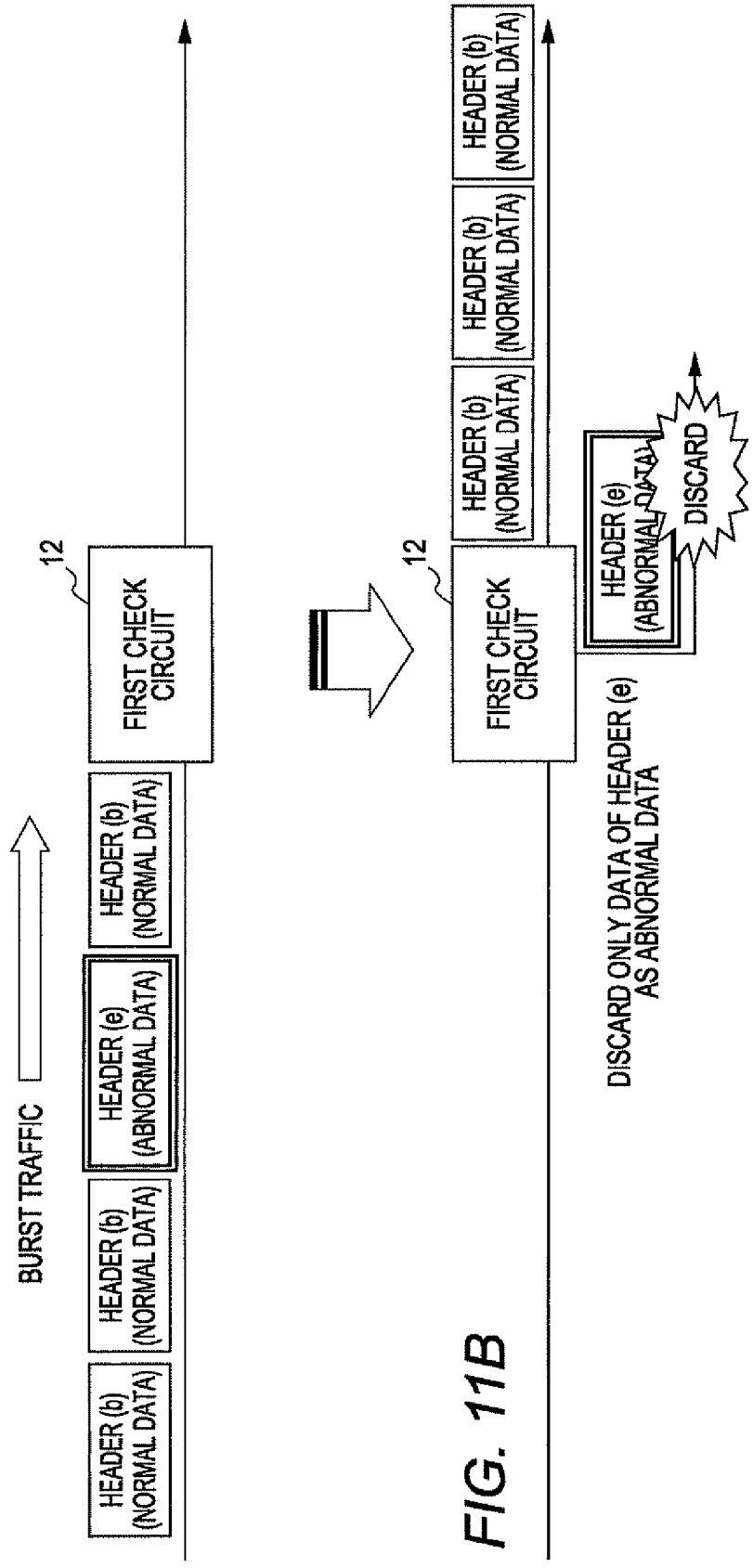
FIG. 11 is an explanatory diagram of operations of the first check circuit at the time of operation confirmation test on burst traffic of the first check circuit by the testing portion in the relay device.

Next, the test scheduler 41 selects first header information that corresponds to relaying header information decided to be abnormal by the first check circuit 12, so that it may be determined to be incorrect test data. In an example of FIG. 11, a header (e) corresponds to the first header information. Further, the test scheduler 41 selects first header information that corresponds to relaying header information decided to be normal by the first check circuit 12 so that it may be determined to be normal test data. In the example of FIG. 11, a header (b) corresponds to the first header information.

Then, the test scheduler 41 permits the data transmission/reception portion 44 to transmit a plurality of test data pieces including incorrect test data and normal test data to the first conversion portion 11 successively in a short time. That is, the data transmission/reception portion 44 successively inputs a plurality of test data pieces as burst traffic to the first conversion portion 11 (S33).

Specifically, the data transmission/reception portion 44 successively transmits at least one, two in this case, normal test data pieces following the incorrect test data pieces. This makes it sure that normal data should be input into the first check circuit 12 immediately following abnormal data as shown in FIG. 11A. Owing to this scheme, in a case where the first check circuit 12 discards abnormal data because of faulty setting etc. of a timing margin of the first check circuit 12, whether the following normal data should be discarded together with it can be checked for sure.

Further, the data transmission/reception portion 44 should preferably transmit a plurality of pieces of test data including a plurality of pieces of incorrect test data so that the operations of the first check circuit 12 on burst traffic may be able to be confirmed more surely.

The test scheduler 41, the data determination portion 42, and the data transmission/reception portion 44 function as a third test transfer data input portion that successively inputs a plurality of pieces of test data including incorrect test data containing first header information which corresponds to incorrect relaying header information, into the first conversion portion 11.

Until all the test data is transmitted completely by the data transmission/reception 44 (NO at S34), the test data continues to be transmitted (S33). If all the test data is transmitted completely by the data transmission/reception 44 (YES at S34), the test scheduler 41 permits the router control portion 43 to read a value of the first counter 13 in the first check circuit 12 after a predetermined time elapses since all the test data is input by the data transmission/reception portion 44 (S35).

Upon starting the present test, the first counter 13 and the second counter 23 are reset to 0 by the test scheduler 41 and the router control portion 43.

Next, the decision portion 45 decides whether the value of the first counter 13 read by the router control portion 43 agrees with the number of the incorrect test data pieces included in all the test data input by the data transmission/reception portion 44 (S36).

The decision portion 45 decides whether the first check circuit 12 is normal based on the value of the first counter 13 and the number of incorrect test data pieces included in a plurality of test data pieces. The decision portion 45 acquires the number of the incorrect test data pieces transmitted from the data transmission/reception portion 44, from the test scheduler 41 or the data transmission/reception portion 44.

If the value of the first counter 13 agrees with the number of the incorrect test data pieces included in all the test data pieces (YES at S36), the decision portion 45 decides that the first check circuit 12 is normal in discarding only abnormal data as shown in FIG. 11B, that is, that a timing margin is set correctly (S37). At S10 of FIG. 2, it is confirmed already that the first check circuit 12 discards abnormal data and passes normal data. Therefore, if the value of the first counter 13 agrees with the number of the incorrect test data pieces, the decision portion 45 can decide that the timing margin of the first check circuit 12 is set correctly.

On the other hand, if the value of the first counter 13 disagrees with the number of the incorrect test data pieces (NO at S36), the decision portion 45 decides that the first check circuit 12 is abnormal and indicates the abnormality of the first check circuit 12 on the external display screen of the relay device 1 or the display screen of the relay device 1 (S38) and ends the processing.

In such a manner, after the first check circuit 12 is confirmed to be normal at operation S10 of FIG. 2, the testing portion 40 inputs a plurality of test data pieces including incorrect test data which should be discarded because it is decided to be abnormal by the first check circuit 12 as burst traffic. Accordingly, based on the value of the first counter 13 and the number of incorrect test data pieces, the decision portion 45 can surely decide whether the first check circuit 12 is normal, that is, whether normal data following discarded abnormal data is not discarded mistakenly together with abnormal data, thus surely deciding whether a timing margin is set appropriately for the first check circuit 12.

Next, the detailed functions of each of the components 41-45 of the testing portion 40 and a test procedure for operation confirmation on burst traffic of the second check circuit 22 by the testing portion 40, that is, the contents of processing of S40 in FIG. 2 will be described in detail below with reference to a flowchart shown in FIG. 12 and FIG. 13.

First, the test scheduler 41 permits the data determination portion 42 to determine a pair of normal relaying header information (header (b)) decided to be normal by the first check circuit 12 and first header information (header (a)), as table data to be registered in the first routing table 10. Further, the test scheduler 41 permits it to determine a pair of normal relaying header information (header (h)) decided to be normal by the first check circuit 12 and first header information (header (g)). Then, the test scheduler 41 permits the router control portion 43 to register these determined table data pieces in the first routing table 10 (S41). Data determination portion 42 and the router control portion 43 perform the processing also at S41 and the later described operation of S42 in the same or roughly the same way as the method described in FIG. 4.

In this case, the header (h) is relaying header information that corresponds to second header information (header (i)) which is decided to be abnormal by the second check circuit 22 and registered in the second routing table 20.

Subsequently, the test scheduler 41 permits the data determination portion 42 to determine, as table data to be registered in the second routing table 20, a pair of the relaying header information (header (b)) registered at operation S41 and normal second header information (header (c)) decided to be normal by the second check circuit 22. Further, the test scheduler 41 permits it to decide a pair of the relaying header information (header (h)) registered at operation S41 and the second header information (header (i)) which should be decided to be abnormal by the second check circuit 22. Then, the test scheduler 41 permits the router control portion 43 to register these determined table data pieces in the second routing table 20 (S42).

That is, the test scheduler 41, the data determination portion 42, and the router control portion 43 function as a second conversion table setting portion that sets table data which corresponds to incorrect second header information that should be decided to be abnormal by the second check circuit 22, in the first routing table 10 and the second routing table 20.

Next, the test scheduler 41 selects first header information that corresponds to the second header information decided to be abnormal by the second check circuit 22, so that it may be determined to be incorrect test data. In an example of FIG. 13, the header (i) is decided to be abnormal by the second check circuit 22, so that the first header information corresponding to the header (i) is the header (g). Further, the test scheduler 41 selects first header information that corresponds to second header information which is decided to be normal by the second check circuit 22 so that it may be determined to be normal test data. In the example of FIG. 13, the header (c) is decided to be normal by the second check circuit 22, so that the first header information corresponding to the header (c) is the header (a).

Then, the test scheduler 41 permits the data transmission/reception portion 44 to transmit a plurality of test data pieces including incorrect test data and normal test data to the first conversion portion 11 successively in a short time. That is, the test scheduler 41 successively inputs a plurality of test data pieces as burst traffic to the first conversion portion 11 (S43).

Specifically, the data transmission/reception portion 44 successively transmits at least one normal test data piece following the incorrect test data pieces so that normal data may be surely transmitted to the second check circuit 22 immediately following abnormal data. Owing to this scheme, in a case where the second check circuit 22 discards abnormal data because of faulty setting etc. of a timing margin of the second check circuit 22, whether the following normal data also should be discarded together with it can be checked for sure.

Further, the data transmission/reception portion 44 should preferably transmit a plurality of pieces of test data including a plurality of pieces of incorrect test data so that the operations of the second check circuit 22 on burst traffic may be able to be confirmed more surely.

The test scheduler 41, the data determination portion 42, and the data transmission/reception portion 44 function as a fourth test transfer data input portion that successively inputs a plurality of pieces of test transfer data including incorrect test data containing first header information (header (g)) to be converted by the second conversion portion 21 into incorrect second header information, to the first conversion portion 11.

The test data continues to be transmitted (S43) until all the test data is transmitted completely by the data transmission/reception 44 (NO at S44). If all the test data is transmitted completely by the data transmission/reception 44 (YES at S44), the test scheduler 41 permits the router control portion 43 to read a value of the second counter 23 in the second check circuit 22 after a predetermined time elapses since all the test data is input by the data transmission/reception portion 44 (S45).

Upon starting the present test, the first counter 13 and the second counter 23 are reset to 0 by the test scheduler 41 and the router control portion 43.

Next, the decision portion 45 decides whether the value of the second counter 23 read by the router control portion 43 agrees with the number of the incorrect test data pieces included in all the test data input by the data transmission/reception portion 44, that is, the number of the test data pieces in the header (g) (S46).

The decision portion 45 decides whether the second check circuit 22 is normal based on the value of the second counter 23 and the number of incorrect test data pieces included in a plurality of test data pieces. The decision portion 45 acquires the number of the incorrect test data pieces from the test scheduler 41 or the data transmission/reception portion 44.

If the value of the second counter 23 agrees with the number of the incorrect test data pieces included in all the test data pieces (YES at S46), the decision portion 45 decides that the second check circuit 22 is normal in discarding only abnormal data, that is, that a timing margin is set correctly (S47). At S10 and S20 of FIG. 2, it is confirmed already that the first check circuit 12 and the second check circuit 22 discard abnormal data and pass normal data, so that if the value of the second counter 23 agrees with the number of the incorrect test data pieces, the decision portion 45 can decide that the timing margin of the second check circuit 22 is set correctly.

On the other hand, if the value of the second counter 23 disagrees with the number of the incorrect test data pieces (NO at S46), it decides that the second check circuit 22 is abnormal and indicates the abnormality of the second check circuit 22 on the external display screen of the relay device 1 or the display screen of the relay device 1 (S48) and ends the processing.

In such a manner, after the first check circuit 12 and the second check circuit 22 are confirmed to be normal at steps S10 and S20 of FIG. 2, the testing portion 40 inputs a plurality of test data pieces including incorrect test data which should be discarded because it is decided to be abnormal by the second check circuit 22 as burst traffic. Accordingly, based on the value of the second counter 23 and the number of incorrect test data pieces, the decision portion 45 can surely decide whether the second check circuit 22 is normal, that is, whether normal data following discarded abnormal data is not discarded mistakenly together with abnormal data, thus surely deciding whether a timing margin is set appropriately for the second check circuit 22.

In such a manner, in the relay device 1 according to the one embodiment, first, in order to check the first check circuit 12, the test scheduler 41, the data determination portion 42, and the router control portion 43 in the testing portion 40 input test data containing information which should be decided to be abnormal by the first check circuit 12, to the first conversion portion 11 as first header information. Then, based on the number of the input test data pieces and a value of the first counter 13, the decision portion 45 in the testing portion 40 decides whether the first check circuit 12 is normal. Therefore, it is possible to surely decide whether the first check circuit 12 in the relay device 1 is abnormal. That is, the abnormal first check circuit 12 can be identified.

In this case, the test scheduler 41, the data determination portion 42, and the router control portion 43 in the testing portion 40 set incorrect relaying header information which should be discarded because it is decided to be abnormal by the first check circuit 12, into the first routing table 10. Then, transfer data containing first header information that corresponds to the set incorrect relaying header information into the first conversion portion 11 as test data. Accordingly, test of the first check circuit 12 can be conducted more surely in the relay device.

If the number of test data pieces agrees with a value of the first counter 13, the decision portion 45 decides that the first check circuit 12 is normal. On the other hand, if the number of test data pieces disagrees with the value of the first counter 13, it decides that the first check circuit 12 is abnormal. Accordingly, whether the first check circuit 12 is normal can be decided more surely.

Furthermore, if the first check circuit 12 is normal, in order to check the second check circuit 22, the test scheduler 41, the data determination portion 42, and the router control portion 43 in the testing portion 40 set incorrect second header information containing information which should be decided to be abnormal by the second check circuit 22, into the second routing table 20. Further, they input test data containing first header information to be converted into incorrect second header information by the second conversion portion 21, into the first conversion portion 11. Then, the decision portion 45 decides whether the second check circuit 22 is normal based on whether a result of conversion relating to the test data is discarded by the second check circuit 22. Therefore, it is possible to surely decide whether the second check circuit 22 in the relay device 1 is abnormal. The abnormal second check circuit 22 can be identified.

In this case, if the result of conversion relating to the test data is discarded by the second check circuit 22, the decision portion 45 decides that the second check circuit 22 is normal. On the other hand, if the result of conversion relating to the test data is yet to be discarded by the second check circuit 22, the decision portion 45 decides that the second check circuit 22 is abnormal. More specifically, if the value of the second counter 23 agrees with the number of test data pieces, the decision portion 45 decides that the second check circuit 22 is normal. On the other hand, if the value of the second counter 23 disagrees with the number of test data pieces, the decision portion 45 decides that the second check circuit 22 is abnormal. Therefore, it is possible to surely decide whether the second check circuit 22 is normal.

Further, if the first check circuit 12 and the second check circuit 22 are normal, in order to conduct an operation test on burst traffic of the first check circuit 12, the test scheduler 41, the data determination portion 42, and the router control portion 43 in the testing portion 40 set incorrect relaying header information which should be decided to be abnormal by the first check circuit 12, into the first routing table 10. Then, they successively input a plurality of test transfer data pieces including third test transfer data containing first header information that corresponds to the incorrect relaying header information, into the first conversion portion 11.

Then, the decision portion 45 decides whether the first check circuit 12 is normal based on the value of the first counter 13, so that it is possible to properly perform operation confirmation on bust traffic of the first check circuit 12.

In a case where abnormal data is discarded because of faulty setting etc. of a timing margin of the first check circuit 12, whether the following normal data is already discarded by the first check circuit 12 mistakenly can be checked for sure.

In this case, if the value of the first counter 13 agrees with the number of the incorrect test data pieces included in the plurality of test data input into the first conversion portion 11, the decision portion 45 decides that the first check circuit 12 is normal. On the other hand, if the value of the first counter 13 disagrees with the number of the incorrect test data pieces, the decision portion 45 decides that the first check circuit 12 is abnormal, so that it is possible to more correctly perform operation confirmation on bust traffic of the first check circuit 12.

Furthermore, if the first check circuit 12 and the second check circuit 22 are normal, in order to conduct an operation test on burst traffic of the second check circuit 22, the test scheduler 41, the data determination portion 42, and the router control portion 43 in the testing portion 40 successively input a plurality of test data pieces including incorrect test data containing first header information to be converted by the second conversion portion 21 into the incorrect second header information set into the second routing table 20, into the first conversion portion 11. Then, the decision portion 45 decides whether the second check circuit 22 is normal based on the value of the second counter 23, so that it is possible to properly perform operation confirmation on bust traffic of the second check circuit 22.

In a case where abnormal data is discarded because of faulty setting of a timing margin of the second check circuit 22, whether the following normal data is already discarded by the second check circuit 22 mistakenly can be checked for sure.

In this case, if the value of the second counter 23 agrees with the number of the incorrect test data pieces included in the plurality of test data, the decision portion 45 decides that the second check circuit 22 is normal. On the other hand, if the value of the second counter 23 disagrees with the number of the incorrect test data pieces, the decision portion 45 decides that the second check circuit 22 is abnormal, so that it is possible to more correctly perform operation confirmation on bust traffic of the first check circuit 12.

The present invention is not limited to the above-described embodiment but can be put to practical use by modifying it in a various way without departing the gist of the present invention.

Figure 14:
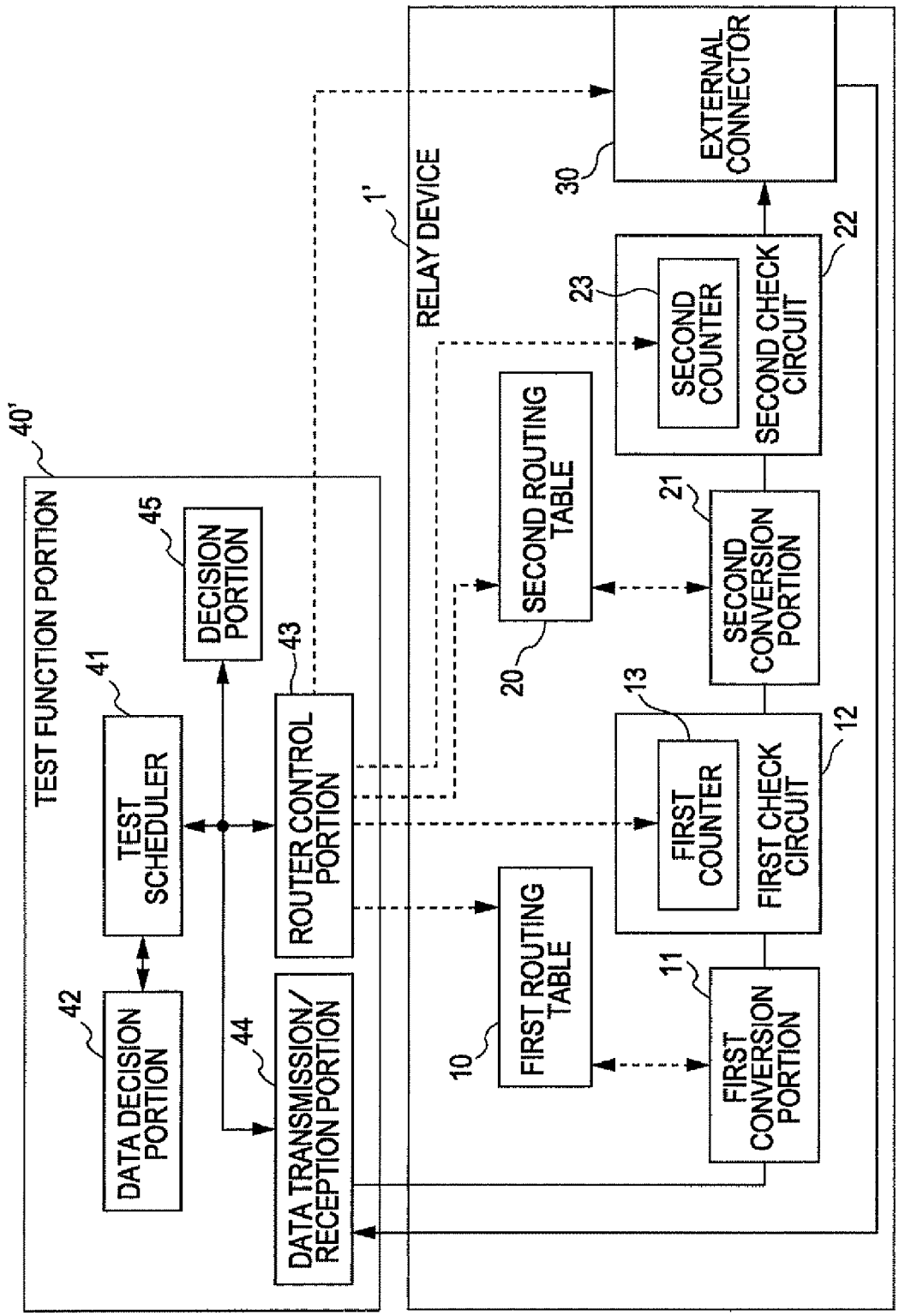
FIG. 14 is a block diagram of a constitution of a variant example of a relay device and a test apparatus.

For example, the above embodiment has been described with reference to an example where the relay device 1 has included the testing portion 40 in constitution, the present invention is not limited to this; as shown in FIG. 14, a testing portion 40' may be disposed outside a relay device 1'.

In FIG. 14, the same reference numerals as the already described ones indicate the identical or roughly identical components.

The test scheduler 41, the data determination portion 42, the router control portion 43, the data transmission/reception portion 44, and the decision portion 45 in the testing portion 40' have the same functions as those in the testing portion 40 according to the above-described one embodiment.

Therefore, the testing portion 40' according to a first variant example will also give the same effects as those by the above-described one embodiment.

Further, in the above-described embodiment, when the first check circuit 12 is being tested, as shown in FIG. 3, it has been configured to the test scheduler 41, the data determination portion 42, and the router control portion 43 register incorrect table data into the first routing table 10 and the test scheduler 41, the data determination portion 42, and the data transmission/reception portion 44 input test data that corresponds to this incorrect table data into the first conversion portion 11. However, the present invention is not limited to this; in order to input test data which should be discarded because it is decided to be abnormal by the first check circuit 12, the test scheduler 41, the data determination portion 42, and the router control portion 43 may be configured to input transfer data containing header information yet to be registered in the first routing table 10 into the first conversion portion 11 as test data. Accordingly, the decision portion 45 can accurately decide whether the first check circuit 12 is normal based on the number of the test data pieces and the value of the first counter 13.

If the first test transfer data input portion inputs test data containing header information yet to be registered in the first routing table 10 into the first conversion portion 11, then the first conversion portion 11 searches the first routing table 10 for the header information not registered in it yet by using the header information as a search key and, naturally, fails in search processing. Then, the first conversion portion 11 transmits an error status indicating the failure in search processing to the first check circuit 12. When having received the error status from the first conversion portion 11, the first check circuit 12 deletes relevant test data containing the header information for which the search processing has failed, whereupon the value of the first counter 13 is incremented by one.

Therefore, by inputting test data containing header information yet to be registered in the first routing table 10 into the first conversion portion 11 at operation S12 of FIG. 3, much the same processing as that of steps S13-S16 of FIG. 3 can be performed, thereby obtaining the same effects as the above-described embodiment. In this case, the test scheduler 41, the data determination portion 42, and the router control portion 43 register ordinary normal table data into the first routing table 10 at operation S11.

Figure 7:
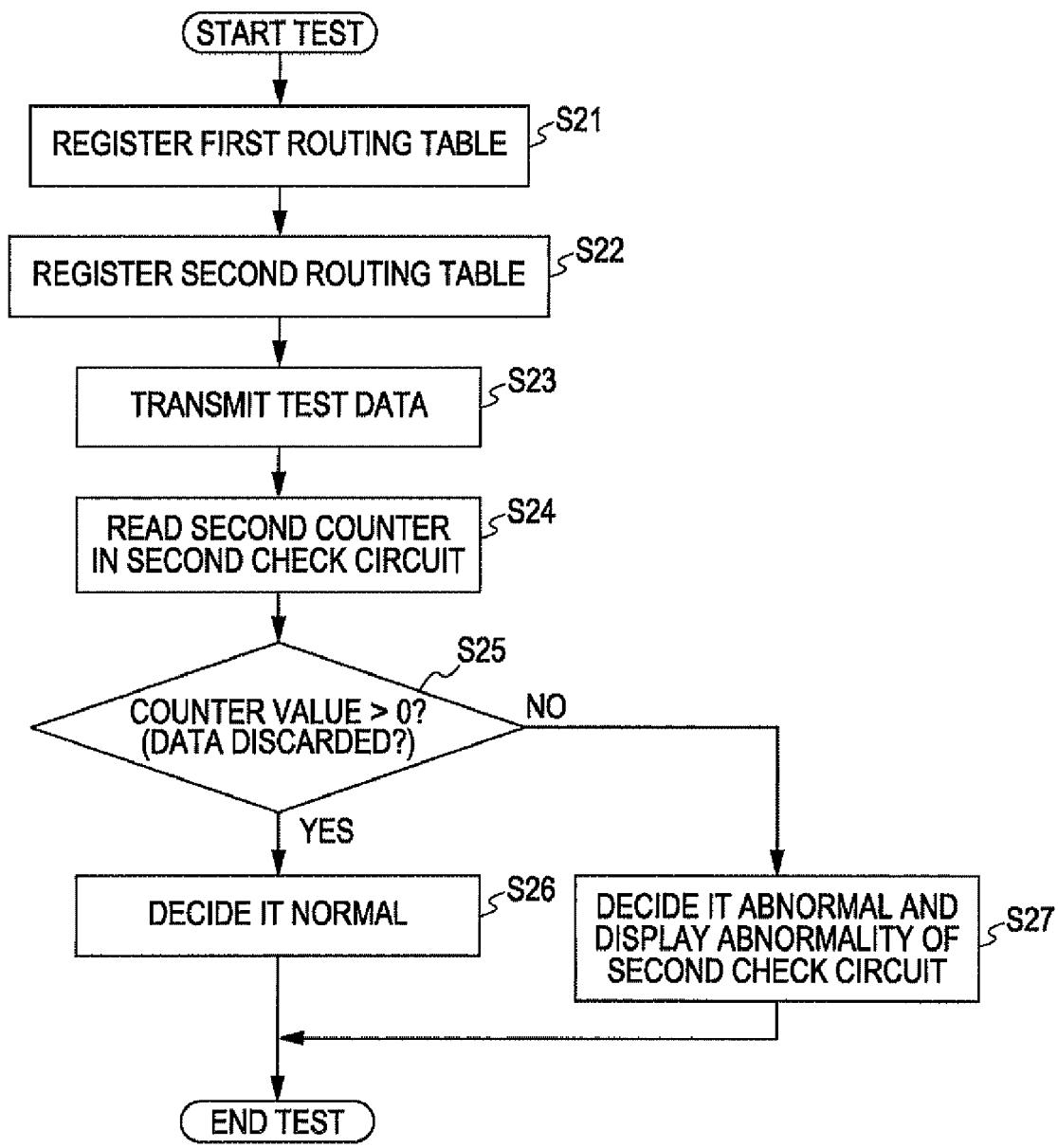
FIG. 7 is a flowchart of a processing procedure of a test of a second check circuit by the testing portion in the relay device.

Further, in the above-described embodiment, the decision portion 45 has decided whether the second check circuit 22 has been normal based on the value of the second counter 23 at steps S24 and S25 of FIG. 7. However, the present invention is not limited to this; for example, the test scheduler 41 and the router control portion 43 may control the external connector 30 so that the data transmission/reception portion 44 can receive data which should be output to the outside after passing through the second check circuit 22, thus permitting the decision portion 45 to decide whether the second check circuit 22 is normal in accordance with whether the data transmission/reception portion 44 has received transfer data which had passed through the second check circuit 12 via external connector 30. It is thus possible to obtain much the same effects as those of the above-described embodiment.

Since the first check circuit 12 is already confirmed to be normal at operation S10 of FIG. 2, the decision portion 45 can decide that the second check circuit 22 is normal if the number of data pieces received by the data transmission/reception portion 44 agrees with the number of input test data pieces.

On the other hand, if the number of data pieces received by the data transmission/reception portion 44 disagrees with the number of input test data pieces, the decision portion 45 can decide that the second check circuit 22 is abnormal.

Further, in the above-described embodiment, in operation confirmation on burst traffic of the first check circuit 12 and that on burst traffic of the second check circuit 22, the decision portion 45 has been configured to conduct decision based on the value of each of the counters 13 and 23 and the number of incorrect test data pieces. However, the present invention is not limited to this. For example, it may be configured to decide whether each of the check circuits 12 and 22 are normal in accordance with whether a sum of the value of each of the counters 13 and 23 and the number of transfer data pieces which pass through the second check circuit 22 and are output from the external connector 30 agrees with a total of a plurality of test data pieces.

Figure 15:
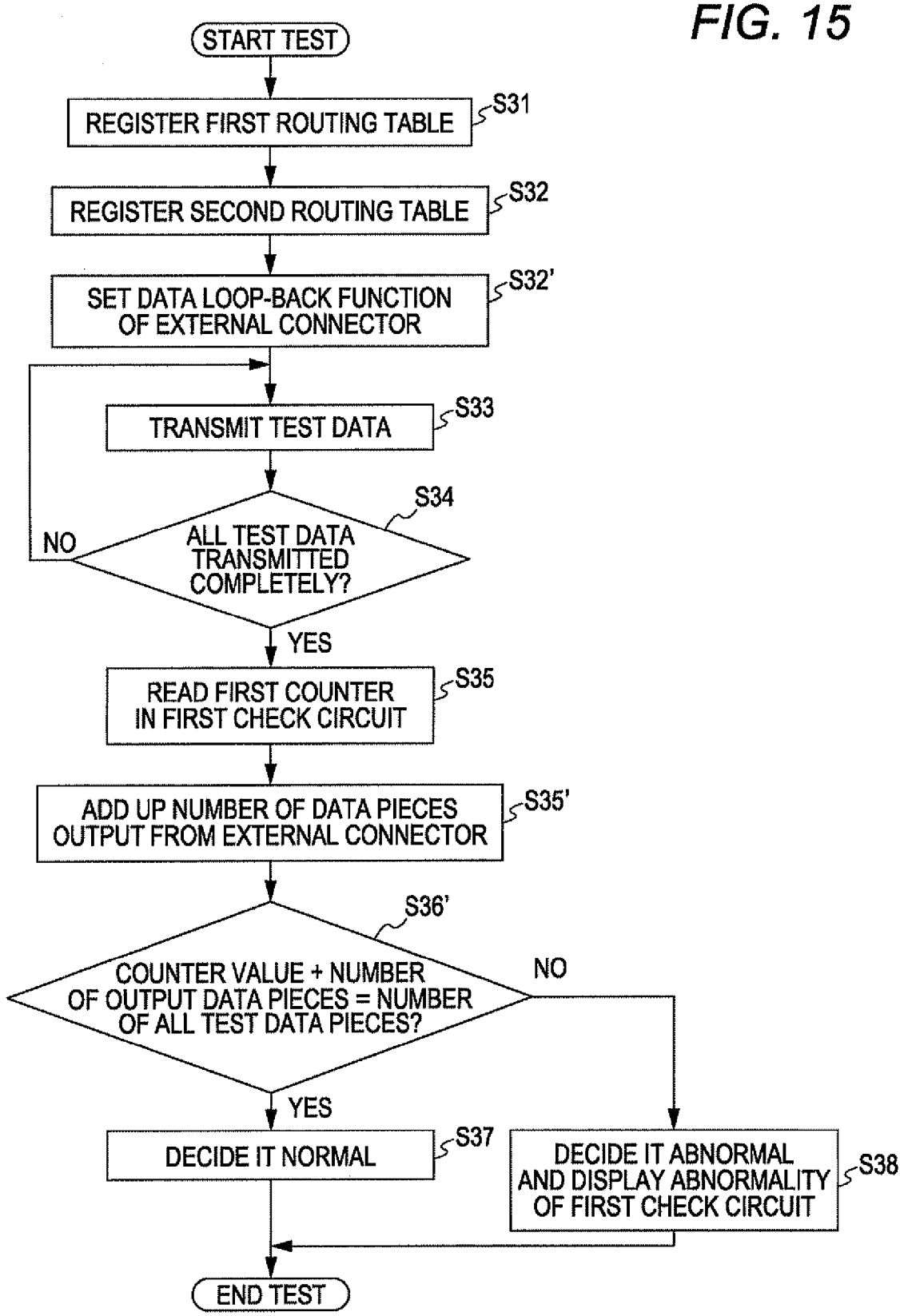
FIG. 15 is a flowchart of a processing procedure of a test of a first check circuit by a testing portion in the relay device.

Operation confirmation on burst traffic of the first check circuit 12 will be described as an example below with reference to a flowchart shown in FIG. 15. In FIG. 15, the same reference numerals as the already described ones indicate the identical or roughly identical components and their detailed explanation will be omitted below.

First, the testing portion 40 registers the first routing table 10 and the second routing table 20 (S31, S32). Next, the test scheduler 41 and the router control portion 43 set a data loop-back function of the external connector 30 so that data which has passed through the second check circuit 22 may be received by the data transmission/reception portion 44 through the external connector 30 (S32').

Subsequently, the data transmission/reception portion 44 transmits all test data (S33), and if it is decided that all the test data is transmitted completely (YES at S34), the router control portion 43 reads the value of the first counter 13 (S35). Further, the data transmission/reception portion 44 adds up the number of the data output from the external connector 30 and received (S35').

Then, the decision portion 45 decides whether a sum of the value of the first counter 13 and the number of transfer data pieces which have passed through the first check circuit 12 and the second check circuit 22 and have been output to the outside of the relay device 1 agrees with a total of the plurality of test data pieces (S36'). If the sum and the total agree (YES at S36'), the decision portion 45 decides that the first check circuit 12 is normal. On the other hand, if the sum and the total disagree (NO at S36'), the decision portion 45 decides that the first check circuit 12 is abnormal.

In such a manner, the decision portion 45 can perform operation confirmation on burst traffic of the first check circuit 12 in accordance with the number of all the test data pieces and the sum of the value of the first counter 13 and the number of transfer data pieces to be output to the outside, thereby obtaining much the same effects as those of the above-described embodiment.

Figure 16:
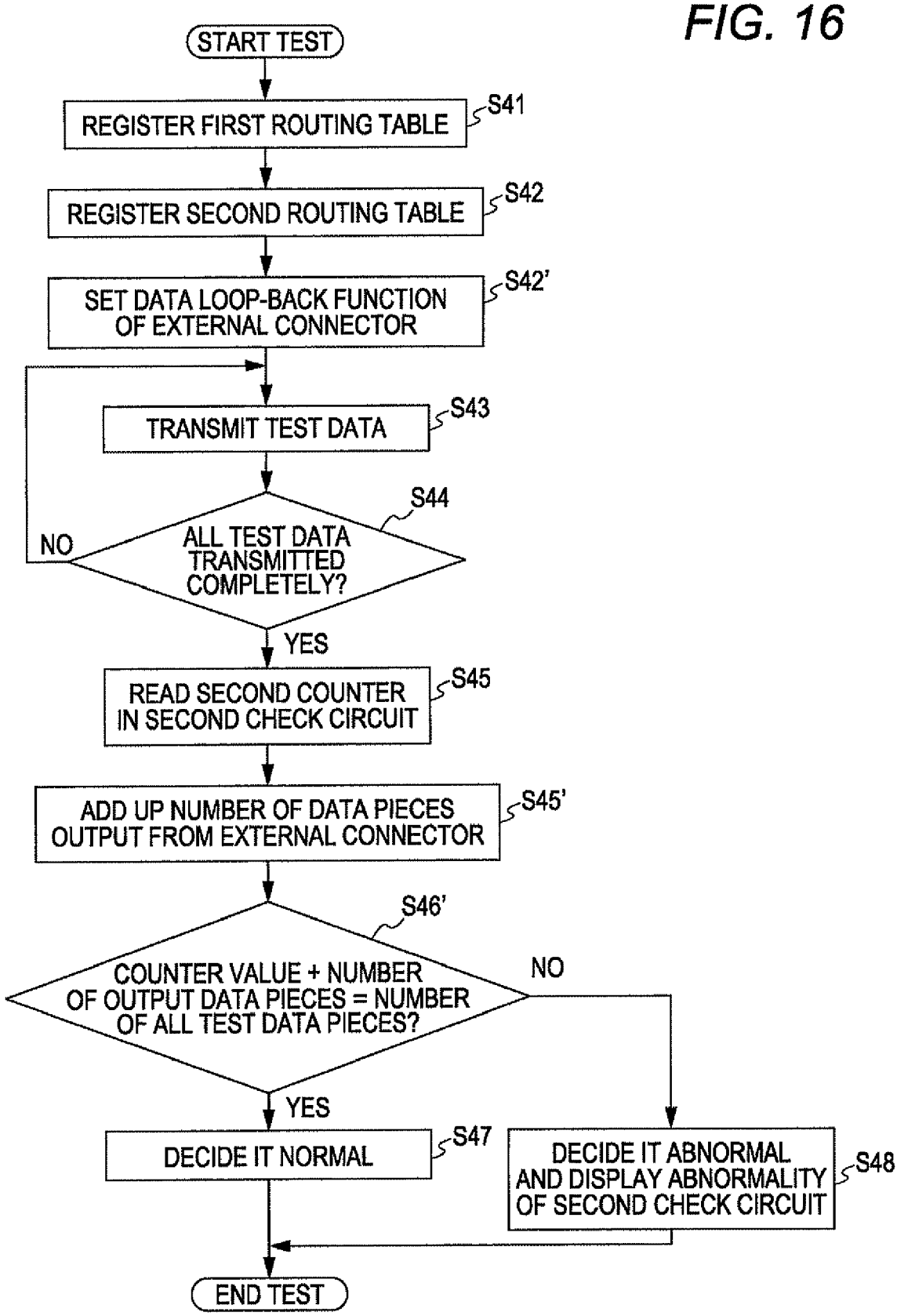
FIG. 16 is a flowchart of a processing procedure of a test of a second check circuit by the testing portion in the relay device.

Further, also in operation confirmation on burst traffic of the second check circuit 22, the testing portion 40 can perform the same operation confirmation as the above-described operation confirmation of the first check circuit 12 as shown by a flowchart of FIG. 16, thereby obtaining much the same effects as those of the above-described embodiment.

Furthermore, the above-described embodiment has been described with reference to an example where the operation confirmation on burst traffic of the first check circuit 12 and the operation confirmation on burst traffic of the second check circuit 22 are performed independently to each other. However, the present invention is not limited to this; those processes of the operation confirmation may be performed simultaneously.

Figure 9:
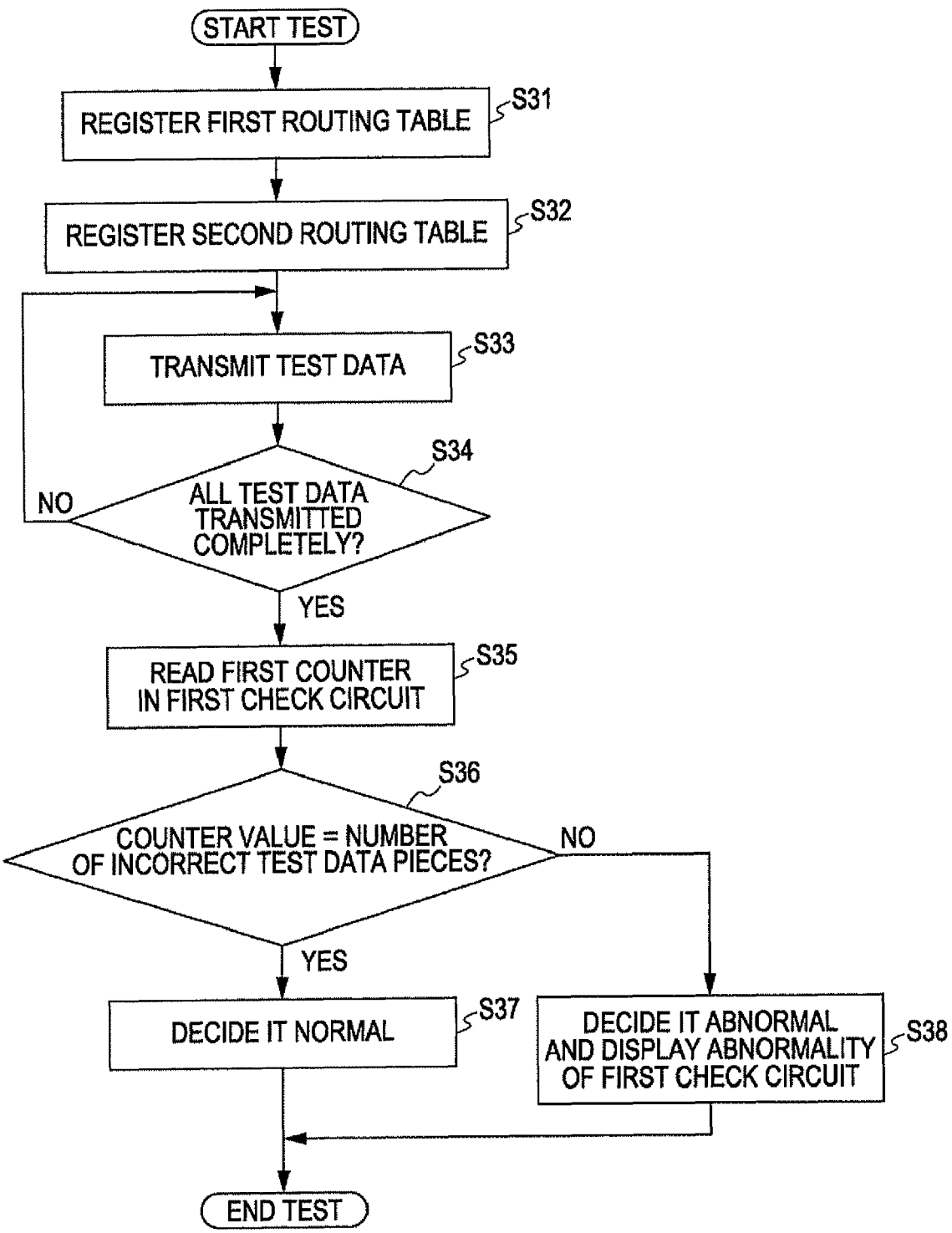
FIG. 9 is a flowchart of a processing procedure of an operation confirmation test on burst traffic of the first check circuit by the testing portion in the relay device.
Figure 10:
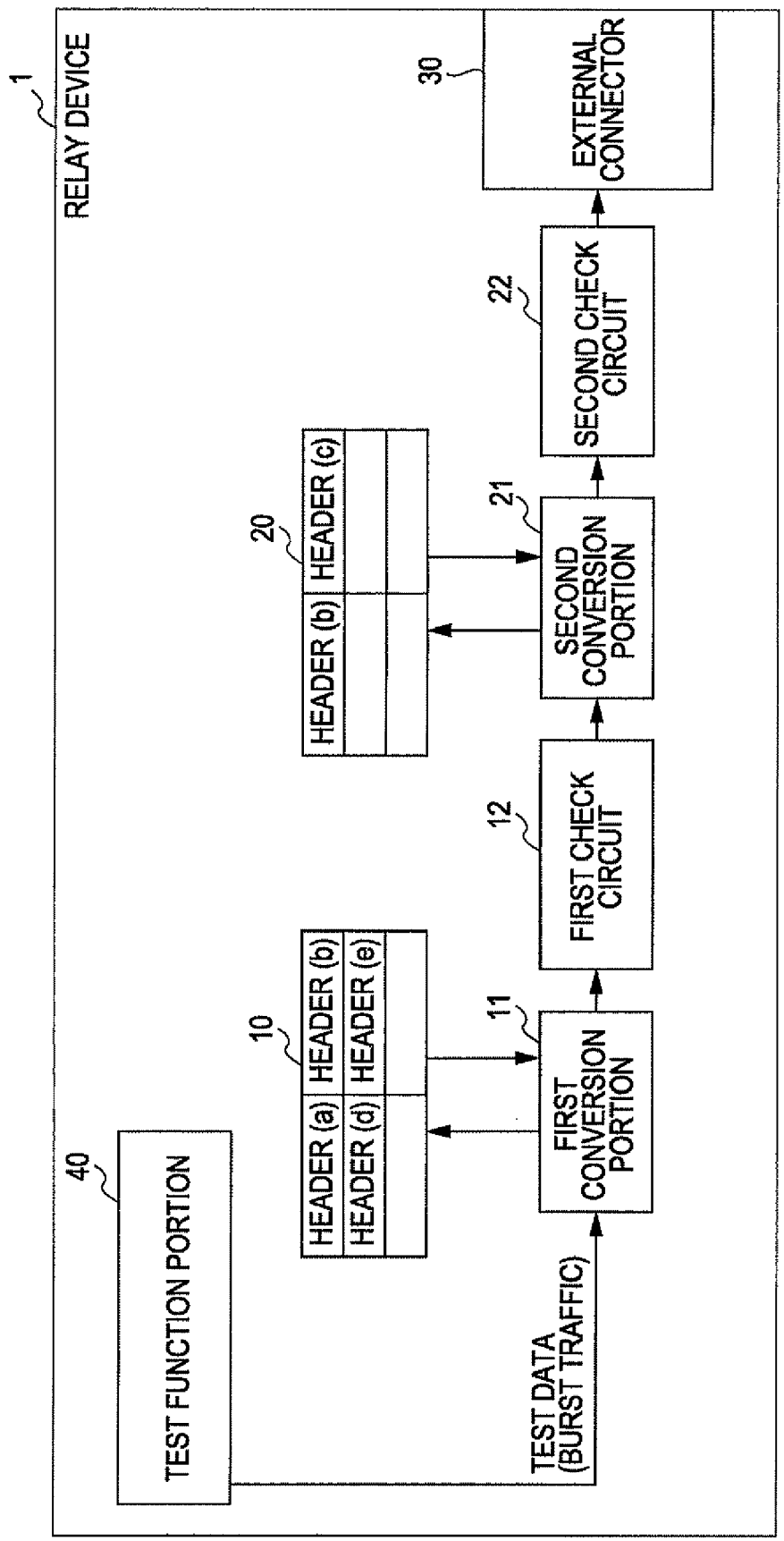
FIG. 10 is an explanatory diagram of the contents of operation confirmation test on burst traffic of the first check circuit by the testing portion in the relay device.
Figure 12:
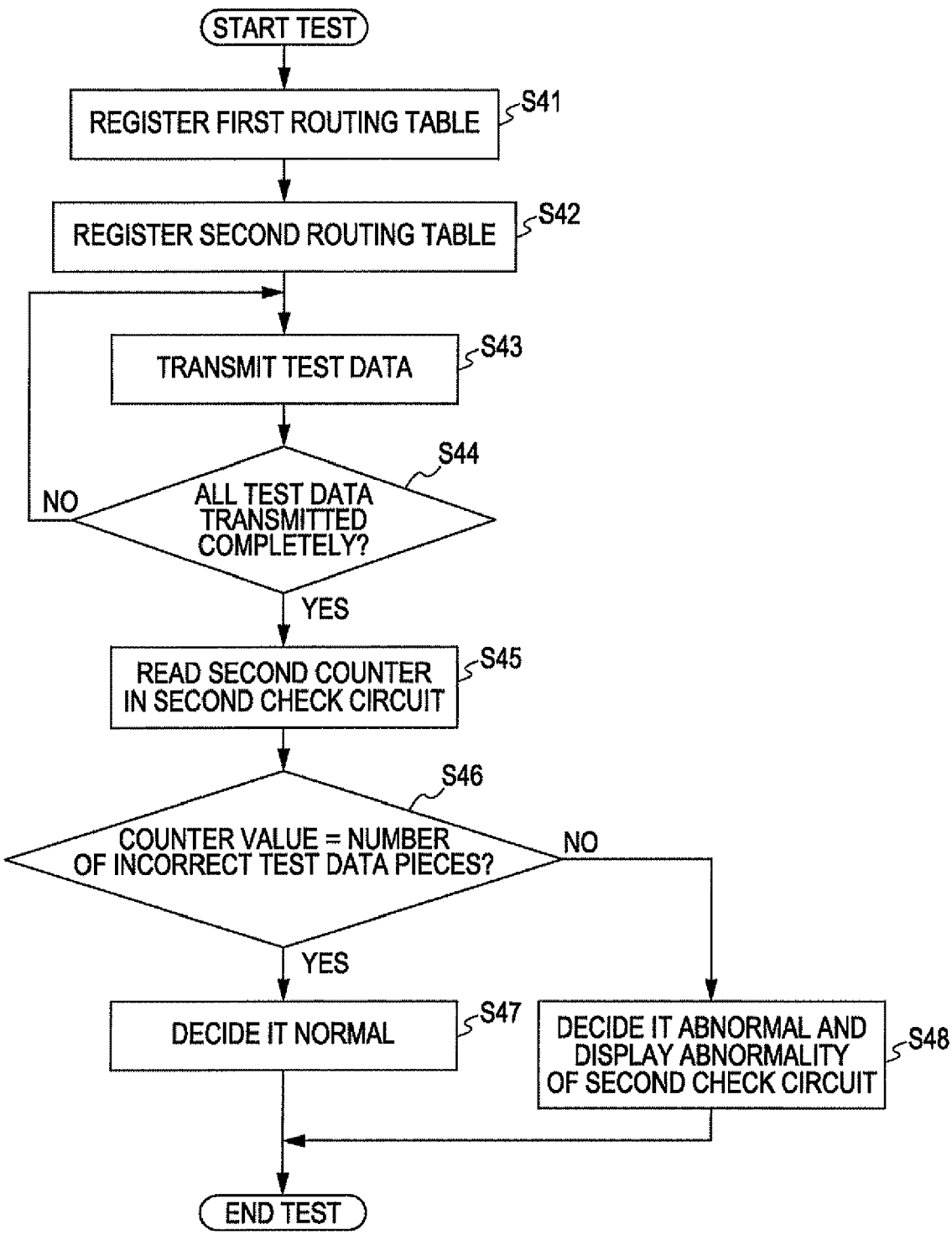
FIG. 12 is a flowchart of a processing procedure of an operation confirmation test on burst traffic of the second check circuit by the testing portion in the relay device.
Figure 13:
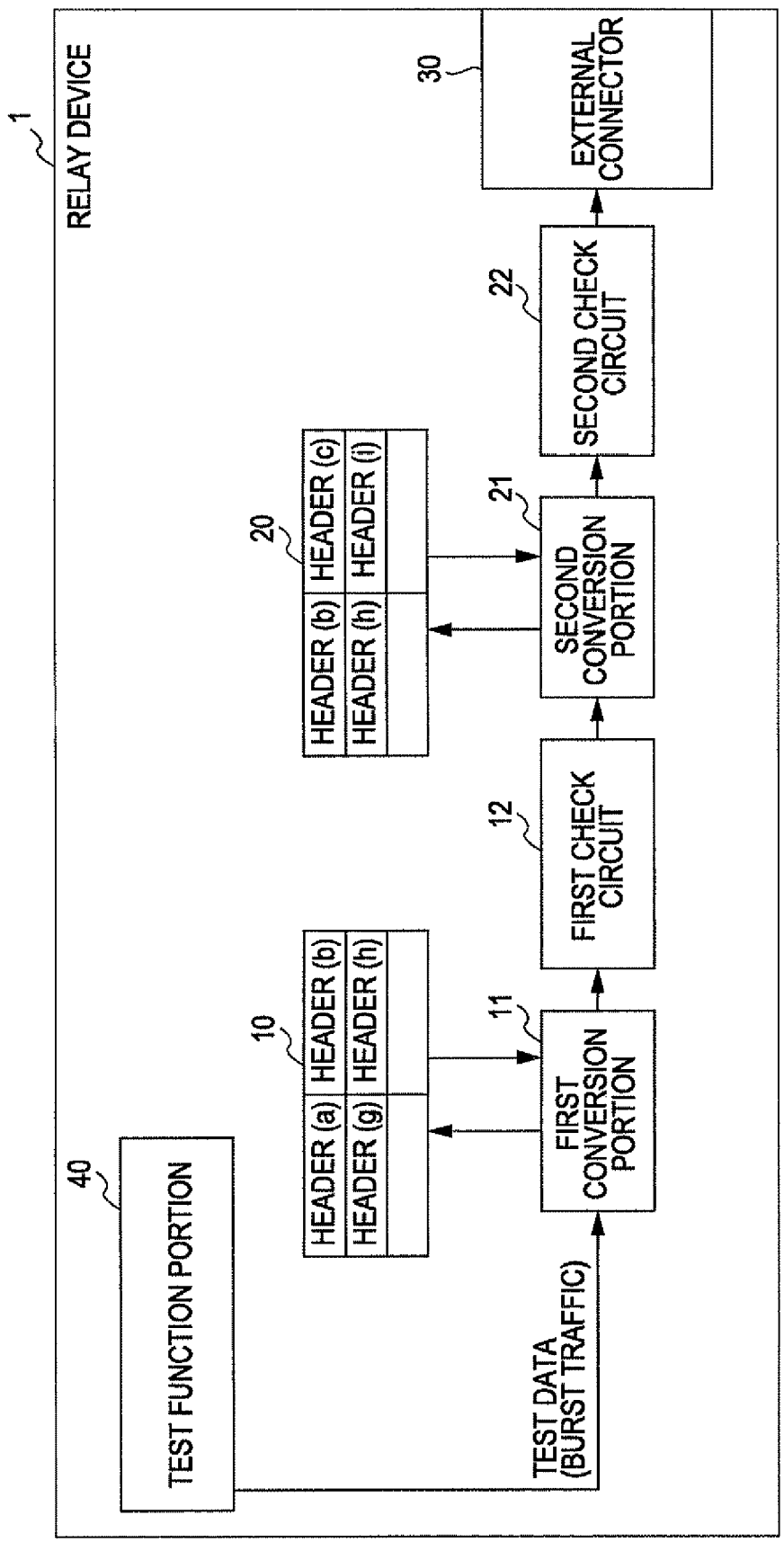
FIG. 13 is an explanatory diagram of the contents of an operation confirmation test on burst traffic of the second check circuit by the testing portion in the relay device.
Figure 17:
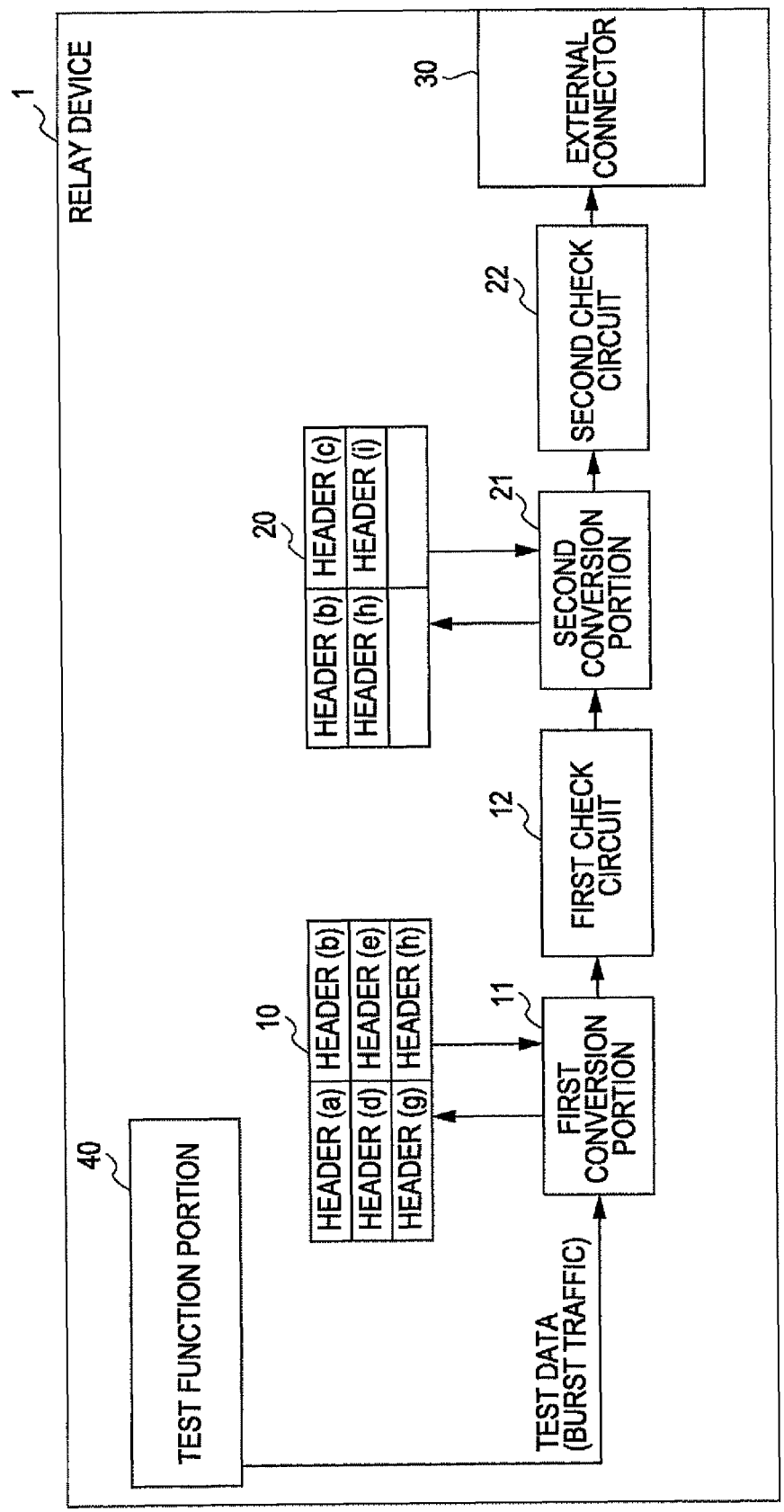
FIG. 17 is an explanatory diagram of the contents of an operation confirmation test on burst traffic of the first check circuit and the second check circuit by the testing portion in the relay device.
Figure 20:
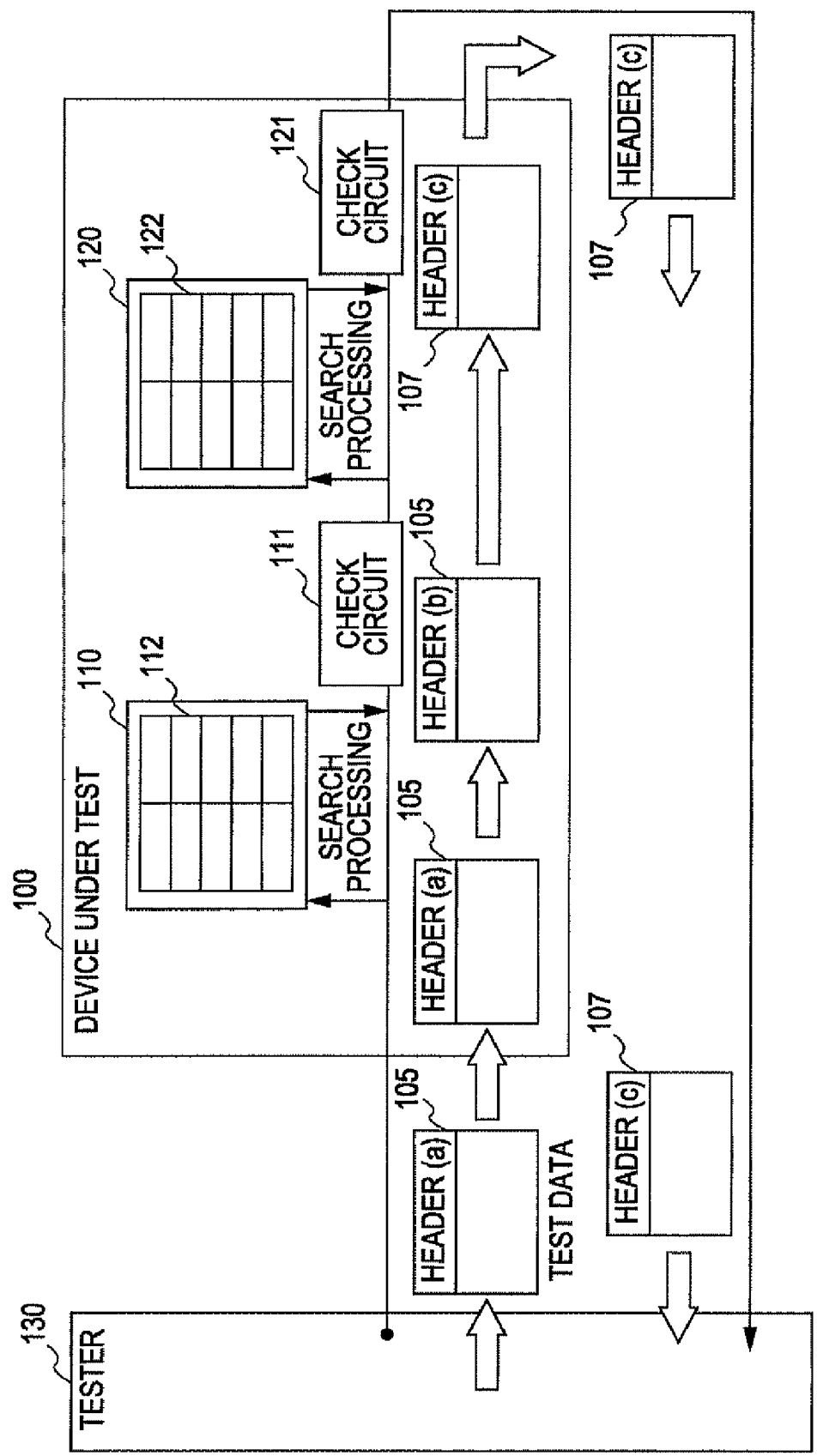
FIG. 20 is a block diagram of a constitution of the conventional network apparatus.
Figures 22A, 22B:
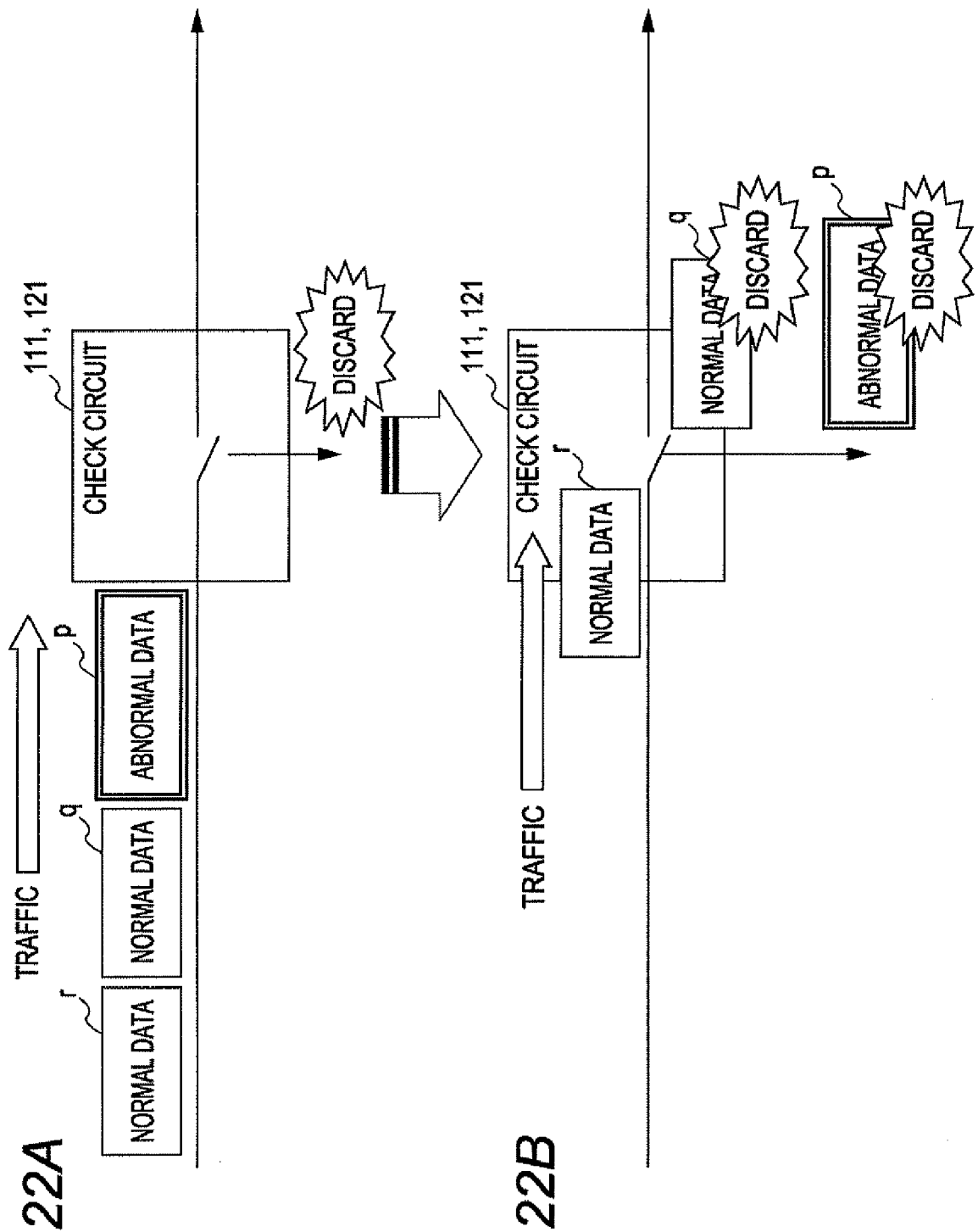
FIG. 22 is an explanatory diagram of different operations of the check circuit in the conventional network apparatus.

As shown in FIG. 17, a pair of the headers (a) and (b), a pair of the headers (d) and (e), and a pair of the headers (g) and (h) are registered into the first routing table 10, in other words, the operation of S31 of FIG. 9 and the operation of S41 of FIG. 12 are performed simultaneously. Further, a pair of the headers (b) and (c) and a pair of the headers (h) and (i) are registered into the second routing table 20, that is, the operation of S32 of FIG. 9 and the operation of S42 of FIG. 12 are performed simultaneously. Then, as test data, a plurality of test data pieces will be transmitted which include normal test data containing the header (a), incorrect test data containing the header (d), and incorrect test data containing the header (g). That is, the operation of S33 of FIG. 9 and the operation of S42 of FIG. 12 are performed simultaneously.

In this case, the test scheduler 41, the data determination portion 42, and the data transmission/reception portion 44 make it sure that the incorrect test data containing the headers (d) or (g) may be followed by the normal test data in arrangement of the plurality of test data pieces.

Then, the processing of S35-S38 of FIG. 9 and the processing of S45-S48 of FIG. 12 are performed respectively, to enable concurrently performing the operation confirmation on burst traffic of the first check circuit 12 and the operation confirmation on burst traffic of the second check circuit 22, thereby obtaining much the same effects as the above-described embodiment and also reducing the test time.

The above-described embodiment and first through fifth variant examples can be performed in various combinations.

Further, the functions of the above-described testing portions 40 and 40', that is, the functions of the test scheduler 41, the data determination portion 42, the router control portion 43, the data transmission/reception portion 44, and the decision portion 45 may be realized by executing a predetermined application program, that is, the test program by using the CPU, an information processing apparatus, or a computer including any type of a terminal.

That program will be provided in a condition where it is recorded in a computer-readable recording medium such as, for example, a flexible disk, CD (CD-ROM, CD-R, CD-RW, etc.), or DVD (DVD-ROM, DVD-RAM, DVD-R, DVD-RW, DVD+R, DVD+RW, etc.). In this case, the computer reads the test program from that recording medium and transfers and stores it to an internal or external storage to use it. Further, it may record that program in a storage (recording medium) such as, for example, a magnetic disk, an optical disk, or a magneto-optical disk and then provide it from that storage to the computer via a communication line.

The computer refers to a machine having a concept of including hardware and the operating system (OS) in that the hardware would operate under the control of the OS. Further, if the OS is unnecessary and the application program alone operates the hardware, this hardware itself is equivalent to the computer. The hardware includes at least a microprocessor such as the CPU and means to read a computer program recorded in a recording medium.

An application program serving as a test program includes program codes that permit such a computer as described above to realize the functions of the testing portions 40 and 40', that is, the functions of the test scheduler 41, the data determination portion 42, the router control portion 43, the data transmission/reception portion 44, and the decision portion 45. Further, some of those functions may be realized by the OS rather than the application program.

Besides the above-described flexible disk, CD, DVD, magnetic disk, optical disk, and magneto-optical disk, the usable recording medium according to the present embodiment may include a variety of computer-readable media such as an IC card, an ROM cartridge, a magnetic tape, a punch card, a computer's internal or external storage including a memory such as an RAM or ROM, and a printed material having printed symbols such as barcodes.

Thus, in one aspect of the present invention, it can accurately decide whether a first check portion in a relay device as a network apparatus is abnormal. That is, it can specify the first check portion and test it, so that the abnormal first check portion can be identified.

Further, in one aspect of the present invention, it can accurately decide whether a second check portion in the relay device is abnormal. That is, it can specify the second check portion and test it, so that the abnormal second check portion can be identified.

Further, in one aspect of the present invention, it can accurately perform operation confirmation on burst traffic of the first check portion. That is, in a case where abnormal data is being discarded because of faulty setting of a timing margin of the first check portion, it is possible to surely check on whether the first check portion has already discarded the following normal data mistakenly.

Furthermore, in one aspect of the present invention, it can accurately perform operation confirmation on burst traffic of the second check portion. That is, in a case where abnormal data is being discarded because of faulty setting of a timing margin of the second check portion, it is possible to surely check on whether the second check portion has already discarded the following normal data mistakenly.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A relay device connected to a plurality of devices, for relaying transfer data to be transmitted between the devices, the relay device comprising:
   a plurality of testers, each of which determines whether received transfer data is normal or not, and discards the transfer data that is determined abnormal;
   a counter that counts a number of transfer data discarded by each of the testers respectively; and
   a determiner that determines whether an operation of each tester is normal or not based on number of transfer data input to the relay device and the number of discarded transfer data counted by the counter.

2. The relay device according to claim 1, further comprising:
   a first table that contains a first header information of a transfer data, and a relaying header information corresponding to the first header;
   a first converter that converts first header information of the transfer data input to the relay device into a corresponding relaying header information based on information contained in the first table;
   a second table contains a relaying header and a second header information corresponding to the relaying header; and
   a second converter that converts relaying header information of the transfer data into a corresponding second header information based on information contained in the second table;
      wherein the testers includes a first tester that determines whether transfer data in which header information is converted by the first converter is normal or not, and a second tester that determines whether transfer data in which header information is converted by the second converter is normal or not.

3. The relay device according to claim 2, further comprising:
   a setter that sets a pair of header information in which converted header information should be determined abnormal into the first table or the second table.

4. A computer readable medium that stores a program causing a computer to perform a testing method of a relay device, the relay device relaying transfer data transmitted between a plurality of devices connected to the relay device and converting a first header information in the transfer data into a second header information, the method comprising:
   registering, in advance, a pair of first header information and a corresponding second header information in which converted header information should be determined abnormal;
   accepting an input of a transfer data having a first header information in which the corresponding second header information should be determined abnormal;
   converting first header information of a transfer data into corresponding second header information;
   determining whether a transfer data in which the header information is converted is normal or not; and
   determining whether an operation of the relay device is normal or not based on the result of determination of the transfer data.

5. A method for testing a relay device that that relays transfer data transmitted between a plurality of devices connected to the relay device, the relay device converting a first header information in transfer data received from any of the devices into a corresponding relaying header information that is used in the relaying device and converting the relaying header information into a corresponding second header information to output the transfer data from the relay device, the method comprising:
   registering, in advance, a pair of a first header information and a corresponding relaying header information that is used in the relay device, or a pair of relaying header information and a corresponding second header information, so as the converted header information should be determined abnormal;
   inputting, into the transfer device, transfer data having a first header information in which corresponding relaying header information or second header information is determined abnormal;
   converting header information of the input transfer data;
   determining whether the transfer data that corresponding header information is converted is normal or not; and
   determining whether an operation of the relay device is normal or not based on first header information of the input transfer data and the result of transfer data determination.

6. The method according to claim 5, further comprising:
   discarding the transfer data that is determined abnormal.

7. A computer readable storing medium that stores computer causing a computer to perform testing method of a relay device, the relay device relaying transfer data that is transmitted between a plurality of devices connected to the relay device and converting a first header information in the transfer data into a second header information, the method comprising:
   converting first header information of a transfer data into a corresponding second header information;
   determining whether a transfer data in which the header information is converted is normal or not;
   discarding the transfer data that is determined abnormal;
   counting a number of discarded transfer data; and determining whether an operation of the relay device is normal or not based on number of transfer data and the number of discarded transfer data.

8. A method for testing a relay device that that relays transfer data transmitted between a plurality of devices connected to the relay device, the relay device converting a first header information in transfer data received from any of the devices into a corresponding relaying header information that is used in the relaying device and converting the relaying header information into a corresponding second header information to output the transfer data from the relay device, the method comprising:

determining whether a result of conversion of the first header information into the relaying header information, or a result of conversion of the relaying header information into the second header information is normal or not;

discarding the transfer data in which the result of header information conversion is determined abnormal;

counting a number of discarded transfer data; and determining an operation of the relay device based on of the number of discarded transfer data.

9. A relay device connected to a plurality of devices, for relaying transfer data to be transmitted between the devices, the relay device comprising:

a first table contains a first header information of a transfer data, and a relaying header information corresponding to the first header;

a first converter that converts first header information of the transfer data input to the relay device into a corresponding relaying header information based on information contained in the first table;

a first tester that determines whether transfer data in which header information is converted by the first converter is normal or not;

a second table contains a relaying header and a second header information corresponding to the relaying header;

a second converter that converts the relaying header information of the transfer data converted by the first converter into a corresponding relaying header information based on information contained in the second table;

a second tester that determines whether transfer data in which header information is converted by the second converter is normal or not;

a setter that sets a pair of header information in which converted header information should be determined as abnormal into the first table or the second table; and a determiner that determines whether an operation of the first tester and the second tester is normal or not based on a result of determination by the first tester and the second tester.

* * * * *

UNITED STATES PATENT AND TRADEMARK OFFICE
CERTIFICATE OF CORRECTION

| | | |
|---|---|---|
| PATENT NO. | : 7,969,897 B2 | |
| APPLICATION NO. | : 12/323787 | |
| DATED | : June 28, 2011 | |
| INVENTOR(S) | : Hiroshi Seki et al. | |

It is certified that error appears in the above-identified patent and that said Letters Patent is hereby corrected as shown below:

Claim 5, Col. 24, line 26, delete "that" (second occurrence) after "device";

Claim 6, Col. 24, lines 54-55, delete "that stores computer";

Claim 8, Col. 25, line 4, delete "that" (second occurrence) after "device";

Claim 8, Col. 25, line 20, delete "of" after "based on".

Signed and Sealed this
Eighteenth Day of October, 2011

David J. Kappos
*Director of the United States Patent and Trademark Office*